US011394184B2

(12) United States Patent
Laplante et al.

(10) Patent No.: US 11,394,184 B2
(45) Date of Patent: Jul. 19, 2022

(54) METHOD FOR FORMING A WIRE BUNDLE AND COUPLING THE WIRE BUNDLE TO A STRUCTURE BACKGROUND

(71) Applicant: The Boeing Company, Chicago, IL (US)

(72) Inventors: Jesse A. Laplante, Monroe, WA (US); Robert T. Johnson, Everett, WA (US); Jin-Seog Seo, Mukilteo, WA (US); Jacky-Vy C. Chau, Seattle, WA (US)

(73) Assignee: The Boeing Company, Chicago, IL (US)

( * ) Notice: Subject to any disclaimer, the term of this patent is extended or adjusted under 35 U.S.C. 154(b) by 782 days.

(21) Appl. No.: 15/972,984

(22) Filed: May 7, 2018

(65) Prior Publication Data

US 2019/0341755 A1 Nov. 7, 2019

(51) Int. Cl.
*H02G 3/04* (2006.01)
*B60R 16/02* (2006.01)
*H01B 13/00* (2006.01)
*H02G 1/06* (2006.01)

(52) U.S. Cl.
CPC ....... *H02G 3/0406* (2013.01); *B60R 16/0215* (2013.01); *H01B 13/0036* (2013.01); *H02G 1/06* (2013.01)

(58) Field of Classification Search
CPC .............. H01B 13/0036; H01B 13/012; H01B 13/01245; H02G 3/0406; H02G 1/06; B60R 16/0215

USPC ................ 29/872, 868, 825, 592.1
See application file for complete search history.

(56) References Cited

U.S. PATENT DOCUMENTS

| 4,803,778 A * | 2/1989 | Cross ........................ B25J 9/00 29/33 M |
| 6,209,827 B1 * | 4/2001 | Kawai ..................... F16B 21/02 248/74.3 |
| 9,431,810 B2 * | 8/2016 | Luthi ....................... H02G 5/00 |
| 2006/0076073 A1 * | 4/2006 | Levin ............... H01B 13/01272 140/93.2 |
| 2019/0226606 A1 * | 7/2019 | Seo ......................... H02G 3/32 |

* cited by examiner

*Primary Examiner* — Peter Dungba Vo
*Assistant Examiner* — Azm A Parvez
(74) *Attorney, Agent, or Firm* — Perman & Green, LLP

(57) ABSTRACT

A method of forming a wire bundle, the method includes removably coupling a plurality of wire bundle mounting structures to a wire bundle form board, the plurality of wire bundles mounting structures being coupled to the wire bundle form board in a predetermined pattern corresponding to a configuration of the wire bundle. The method also includes inserting one or more wires, of the wire bundle, into the plurality of wire bundle mounting structures, coupling the one or more wires to the plurality of wire bundle mounting structures with a respective wire bundle retention strap of each of the plurality of wire bundle mounting structures so as to form the wire bundle, and removing the one or more wires and the plurality of wire bundle mounting structures from the wire bundle form board as a singular unit.

20 Claims, 12 Drawing Sheets

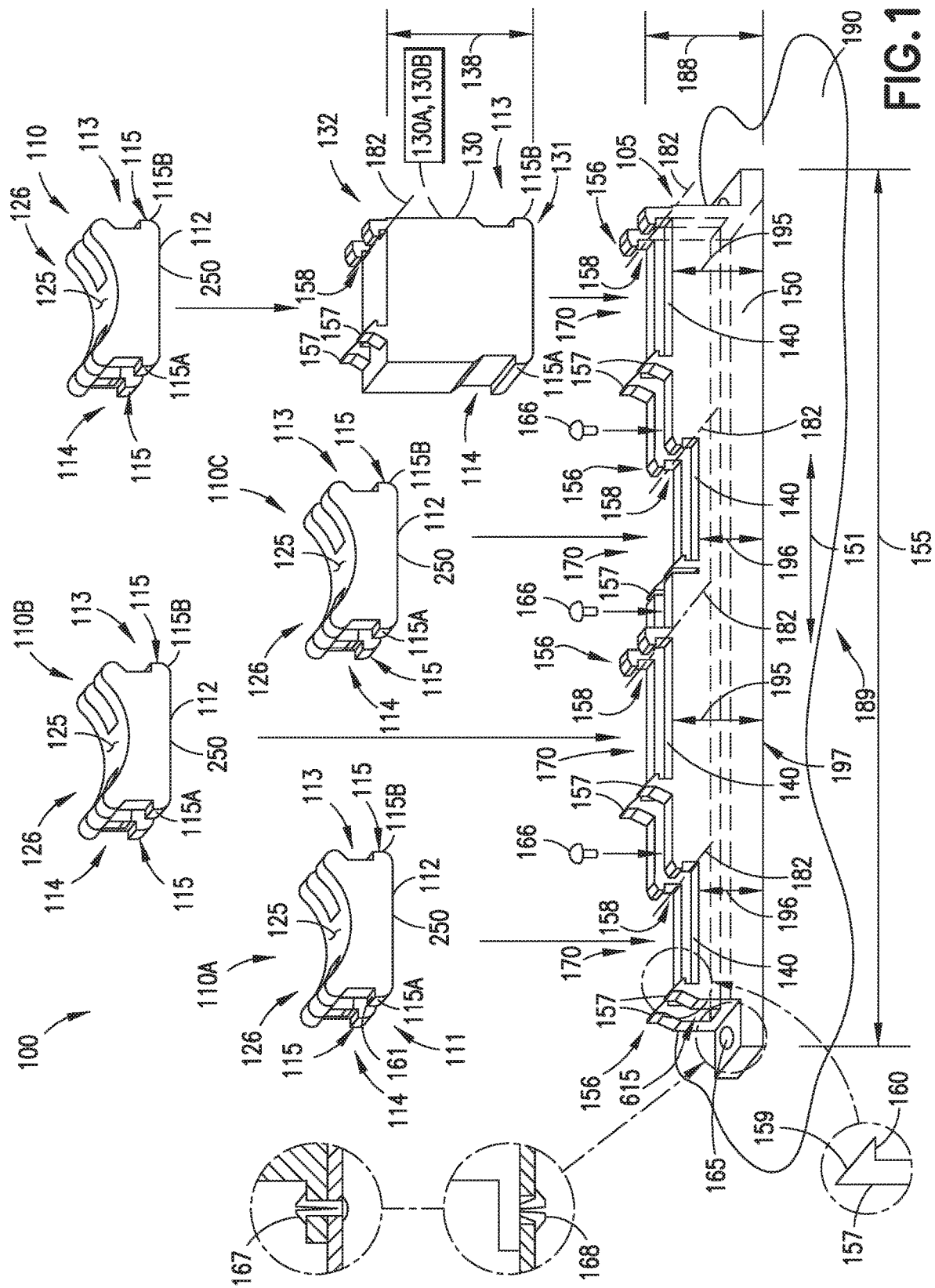

METHOD FOR FORMING A WIRE BUNDLE AND COUPLING THE WIRE BUNDLE TO A STRUCTURE BACKGROUND

BACKGROUND

1. Field

The exemplary embodiments generally relate to wire bundling and more particularly to apparatus to form wire bundles and couple the wire bundles to a structure.

2. Brief Description of Related Developments

Generally wire bundles for vehicles, such as aircraft, are formed using a form board into which pegs are manually inserted. Wires that form the wire bundle are then placed on the form board around the pegs so as to form the wire bundle into a predetermined configuration. Once the wires forming the wire bundle are placed on the form board and routed around the pegs, the wires are tied together, such as by wrapping the wires with a tape, coupling the wires together with tie wraps, etc.

Generally each form board, and the pegs coupled thereto, is specific to a respective wire bundle predetermined configuration. As such, a manufacturer of wire bundles generally has to store at least one form board for each predetermined configuration of wire bundle the manufacturer produces. This storage of the form boards occupies floor space that could otherwise be put to use for more profitable operations of the manufacturer.

Further, the wire bundles that are formed are generally coupled to structures using metal or composite spanner bars. These metal spanner bars have nut runners extending therefrom to couple the spanner bars to the structure and to provide mounting locations for the wire bundles. Generally installation of the nut runners onto the spanner bar requires accessing fasteners from a back side of the spanner bars (e.g., a side of the spanner bar opposite the side on which the nut runners are located). As such, the spanner bars are manufactured with pass throughs (e.g., spaces between the spanner bar and the structure to which the spanner bar is coupled). These pass throughs increase the distance between the structure and the wire bundles. With the spanner bars installed on the structure the wire bundles are coupled to the nut runners using tie wraps. Installation of the spanner bars and wire bundles in this manner may be time consuming as tools are needed to both install the spanner bars and couple the wire bundles to the nut runners of the spanner bars. In addition, the metal spanner bars and nut runners increase the weight of the vehicle which may reduce fuel efficiency of the vehicle.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a fixture for coupling wire bundles to a structure, the fixture comprising: at least one wire bundle mounting structure, the at least one wire bundle mounting structure having quick connect mounting features, and quick connect strap retention features; a spanner bar having mating quick connect mounting features that mate with the quick connect mounting features of the at least one wire bundle mounting structure for coupling the at least one wire bundle mounting structure to the spanner bar; and a wire bundle retention strap having a first end pivotally coupled to the at least one wire bundle mounting structure, and a second end having mating quick connect strap retention features that mate with the quick connect strap retention features of the at least one wire bundle mounting structure to couple the second end to the at least one wire bundle mounting structure.

Another example of the subject matter according to the present disclosure relates to a fixture for coupling wire bundles to a structure, the fixture comprising: a plurality of wire bundle mounting structures, each wire bundle mounting structure including a frame, quick connect mounting features coupled to the frame, quick connect strap retention features coupled to the frame, a wire bundle retention strap having a first end pivotally coupled to the frame, and a second end having mating quick connect strap retention features that mate with the quick connect strap retention features; and a longitudinally extended spanner bar having a plurality of wire bundle mounting recesses spaced along a longitudinal length of the spanner bar, each wire bundle mounting recess including mating quick connect mounting features that mate the quick connect mounting features of a respective wire bundle mounting structure for coupling the at least one wire bundle mounting structure to the spanner bar.

Still another example of the subject matter according to the present disclosure relates to a method of coupling wire bundles to a structure, the method comprising: coupling a wire bundle mounting structure to a wire bundle with a wire bundle retention strap extending through the wire bundle mounting structure, where the wire bundle retention strap has a first end pivotally coupled to a frame of the wire bundle mounting structure, and a second end having mating quick connect strap retention features that mate with quick connect strap retention features of the wire bundle mounting structure; coupling a spanner bar to the structure; and coupling the wire bundle mounting structure, with the wire bundle coupled thereto, to the spanner bar, where the wire bundle mounting structure is coupled to a wire bundle mounting recesses of the spanner bar with quick connect mounting features of the spanner bar that mate the quick connect mounting features of the wire bundle mounting structure.

Another example of the subject matter according to the present disclosure relates to a method of forming a wire bundle, the method comprising: removably coupling a plurality of wire bundle mounting structures to a wire bundle form board, the plurality of wire bundles mounting structures being coupled to the wire bundle form board in a predetermined pattern corresponding to a configuration of the wire bundle; inserting one or more wires, of the wire bundle, into the plurality of wire bundle mounting structures; coupling the one or more wires to the plurality of wire bundle mounting structures with a respective wire bundle retention strap of each of the plurality of wire bundle mounting structures so as to form the wire bundle; and removing the one or more wires and the plurality of wire bundle mounting structures from the wire bundle form board as a singular unit.

Yet another example of the subject matter according to the present disclosure relates to a method of forming a wire bundle, the method comprising: inserting at least one wire into at least one wire bundle mounting structure; and coupling the at least one wire to the at least one wire bundle mounting structure with a respective wire bundle retention strap extending through a respective wire bundle mounting structure, where each wire bundle retention strap has a first end pivotally coupled to a frame of the respective wire bundle mounting structure, and a second end having mating quick connect strap retention features that mate with quick connect strap retention features of the respective wire bundle mounting structure; wherein the at least one wire bundle mounting structure is common to both arranging the at least one wire in a predetermined configuration for the formation of the wire bundle, and mounting the wire bundle to a structure.

Still another examples of the subject matter according to the present disclosure relates to a wire bundle forming apparatus comprising: a wire bundle form board having a plurality of mounting structure couplings; and at least one wire bundle mounting structure configured to couple with the plurality of mounting structure couplings for removably coupling the at least one wire bundle mounting structure to the wire bundle form board in a predetermined pattern corresponding to a predetermined configuration of a wire bundle, where, the at least one wire bundle mounting structure has a wire receiving portion in which wires, forming the wire bundle, are placed and coupled to the at least one wire bundle mounting structure, and the at least one wire bundle mounting structure is common to both arranging the at least one wire in the predetermined configuration for the formation of the wire bundle, and, when removed from the wire bundle form board with the wire bundle coupled to the at least one wire bundle mounting structure, a fixture for coupling the wire bundle to a structure.

BRIEF DESCRIPTION OF THE DRAWINGS

Figure 1A:
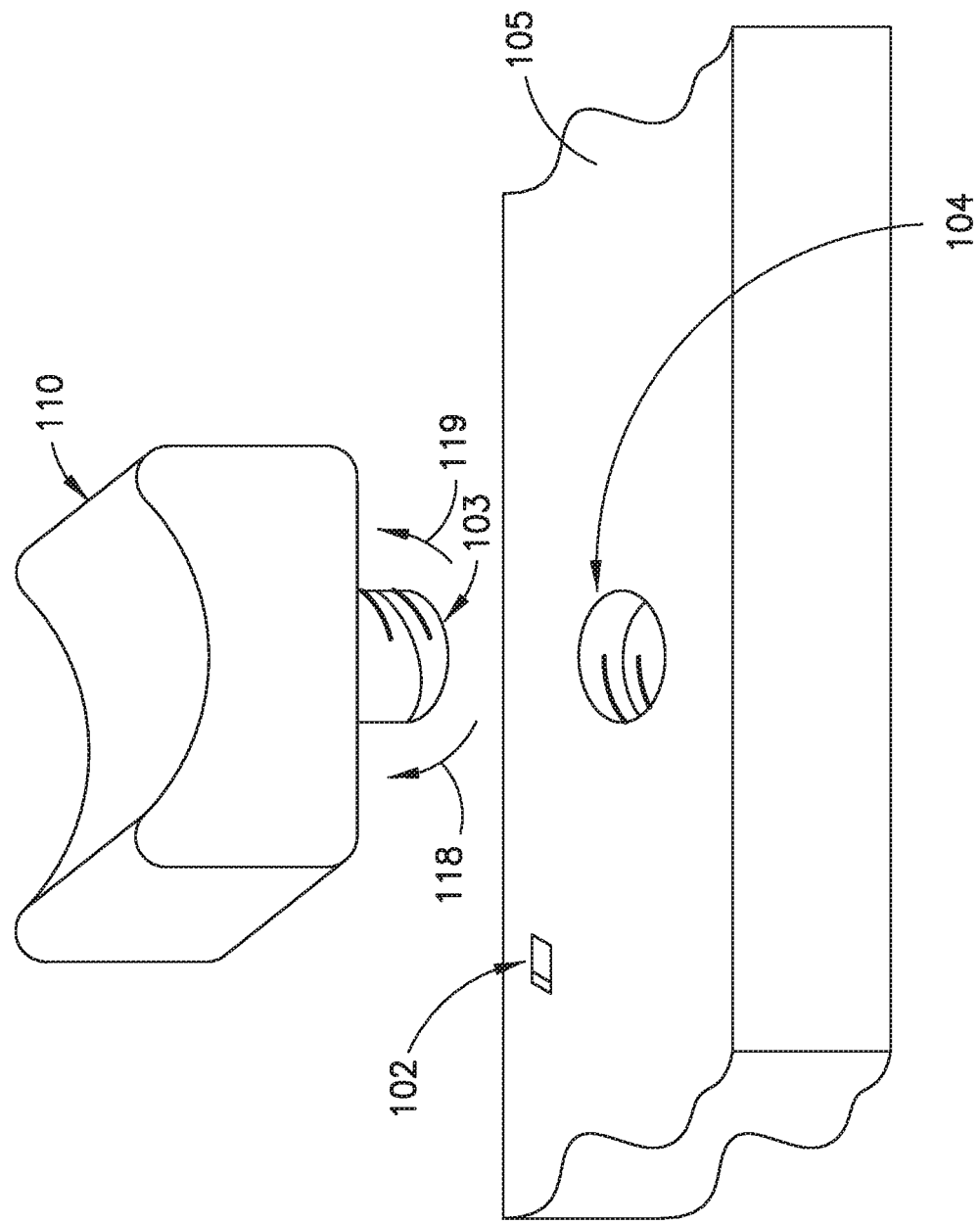
Figure 2A:
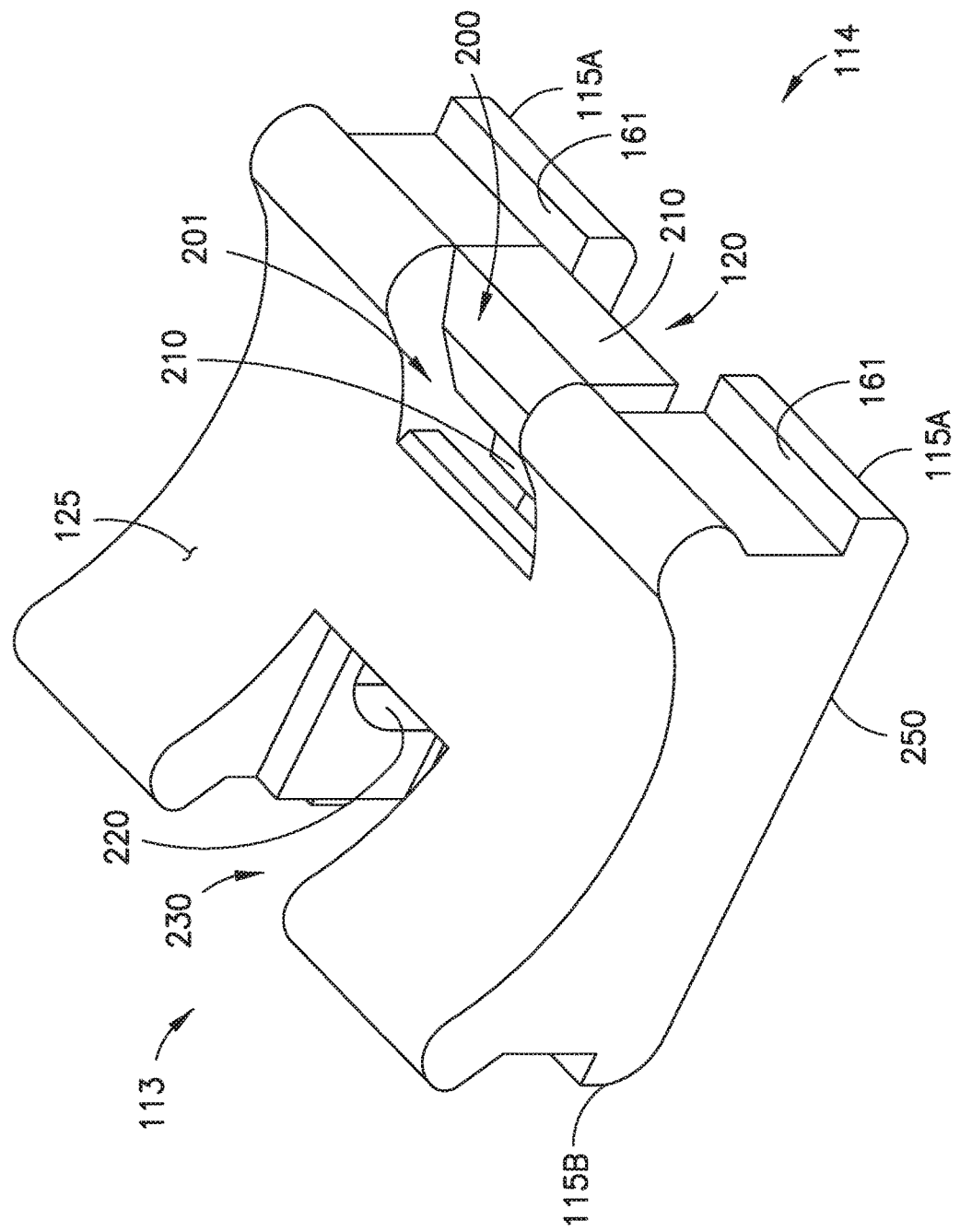
Figure 2B:
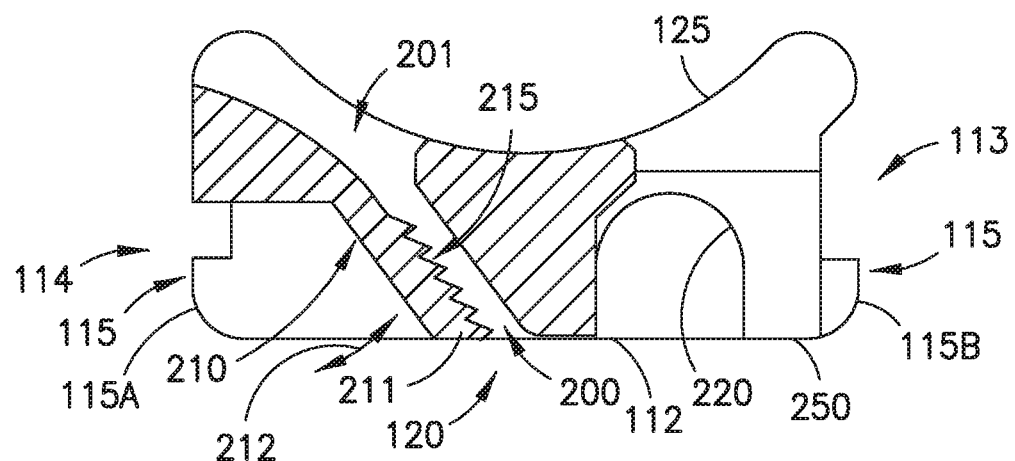
Figure 2C:
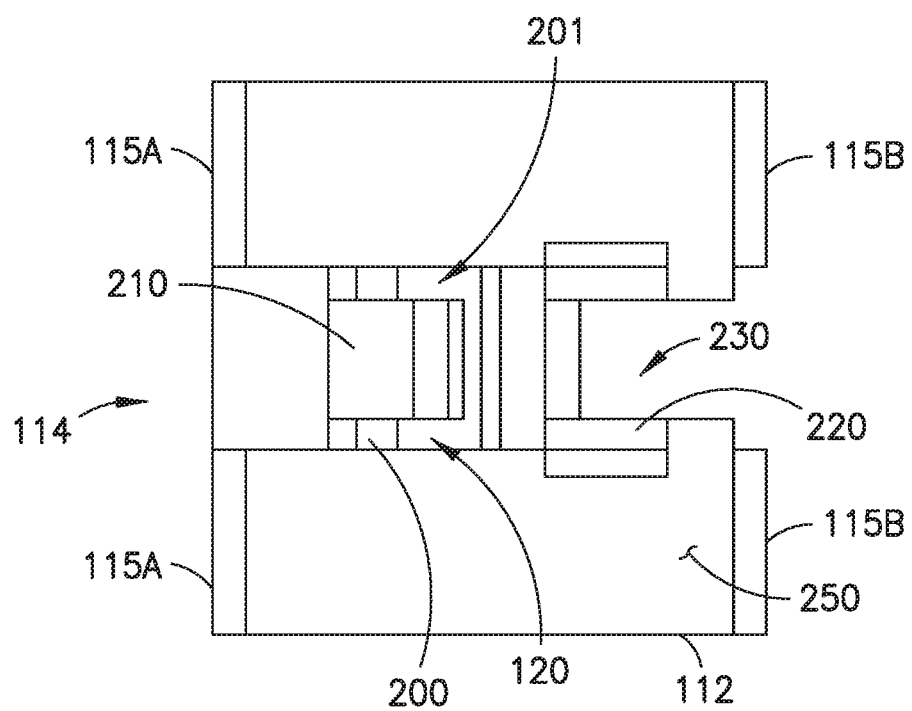
Figure 3A:
Figure 3B:
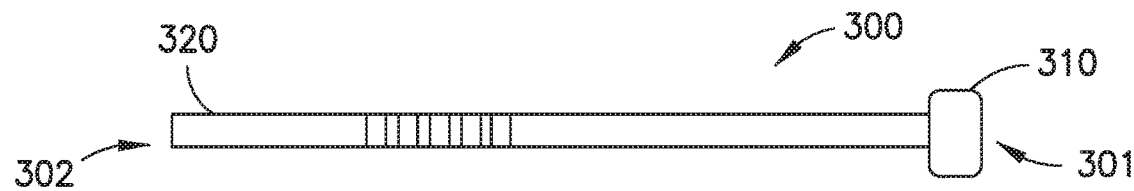
Figure 4A:
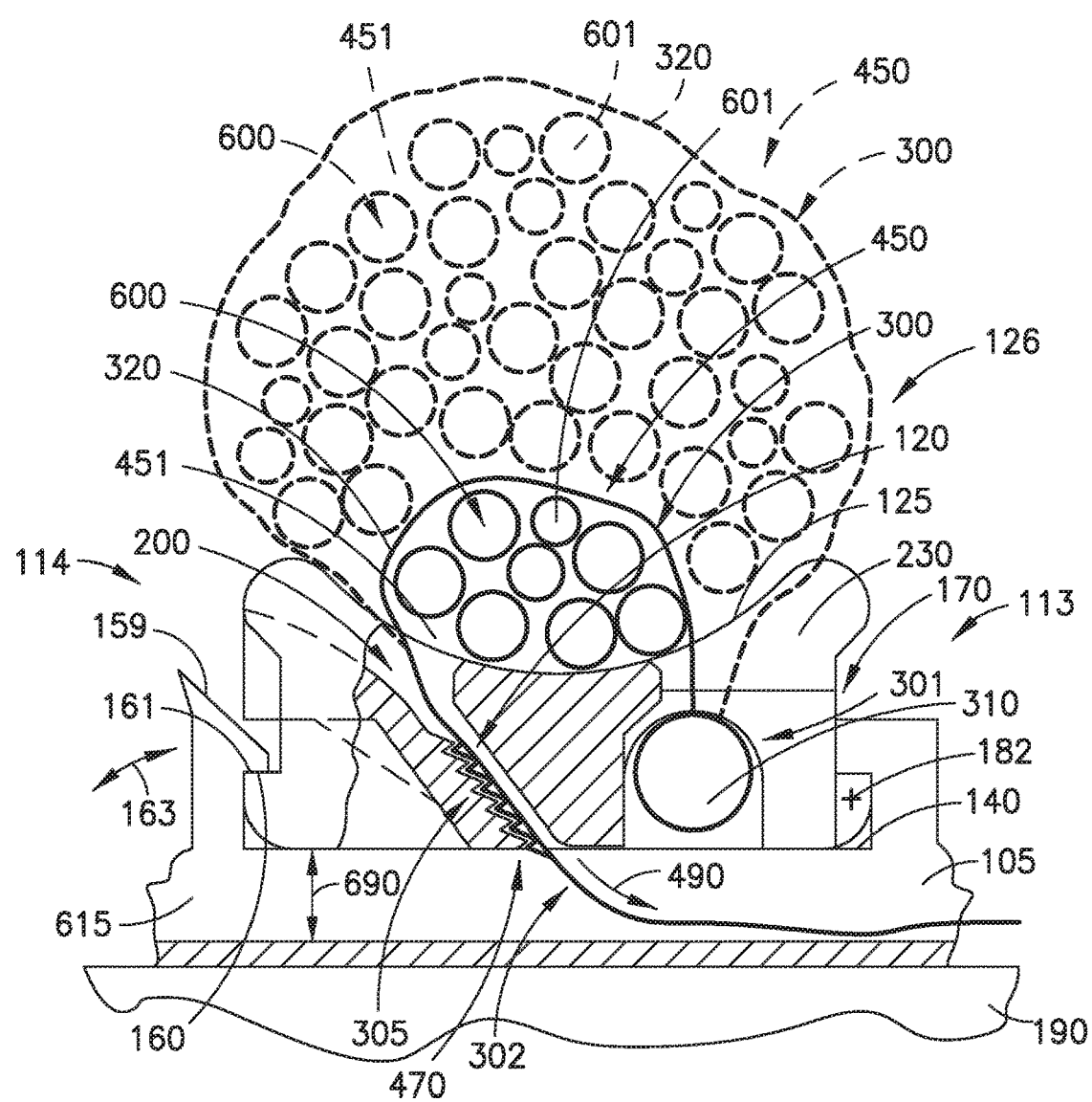
Figure 4B:
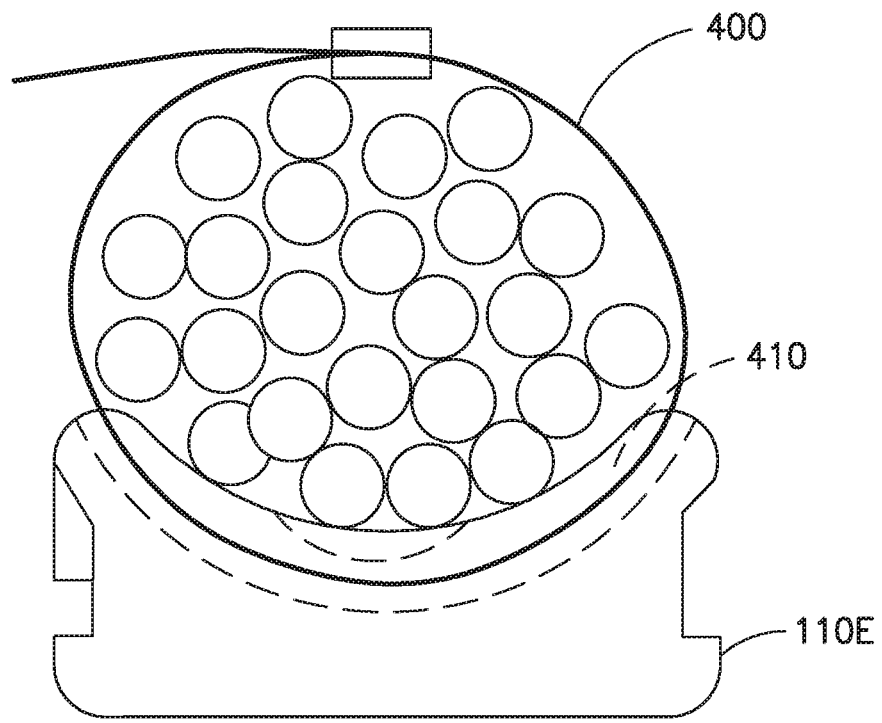
Figure 4C:
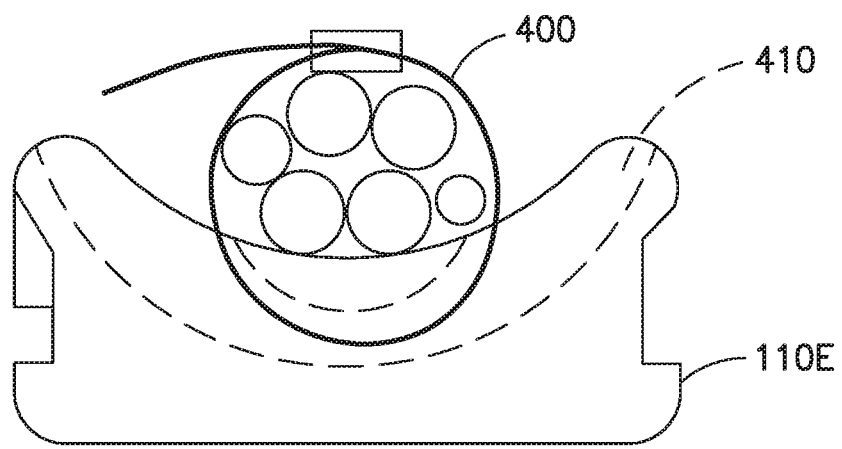
Figure 5:
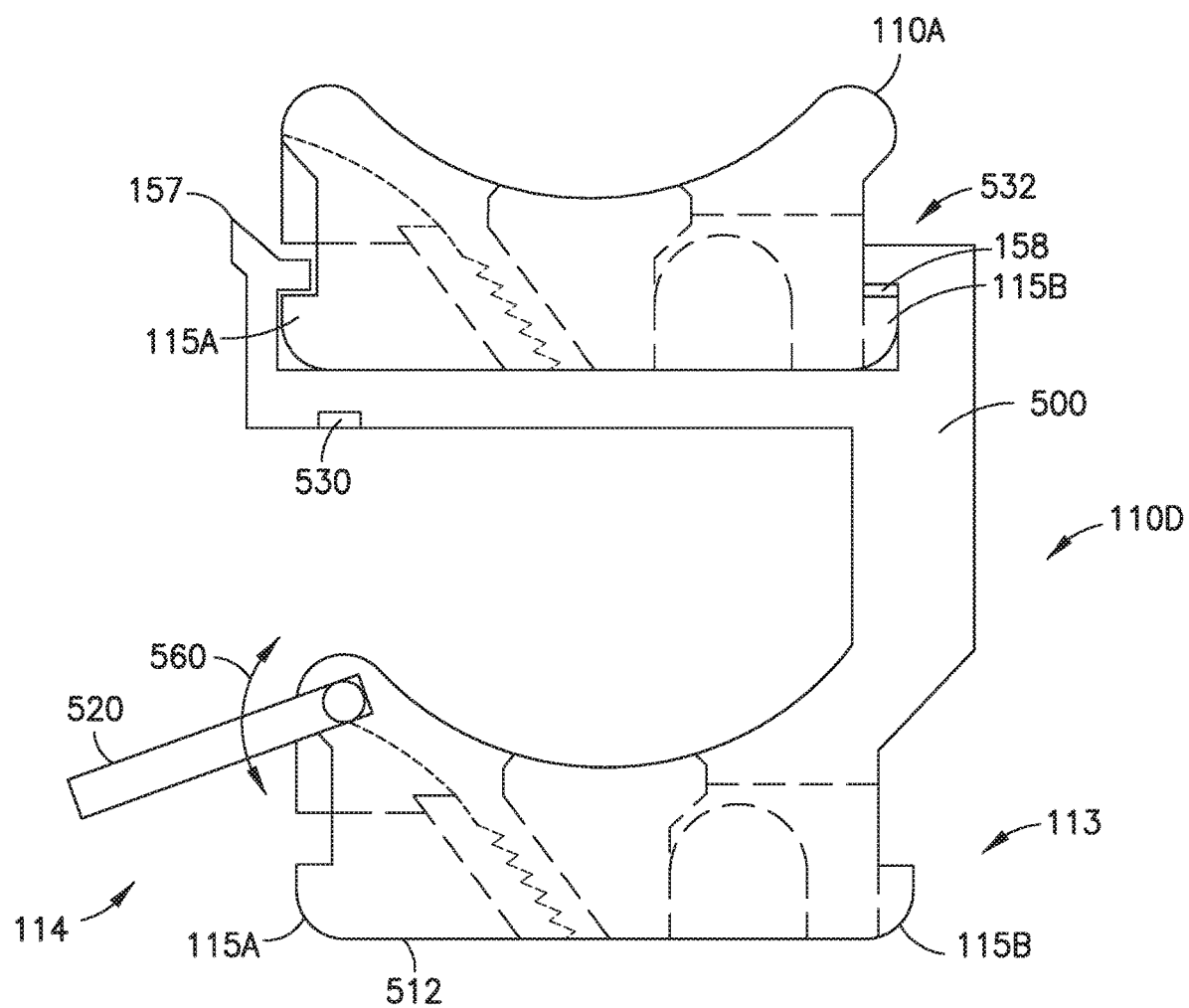
Figure 7:
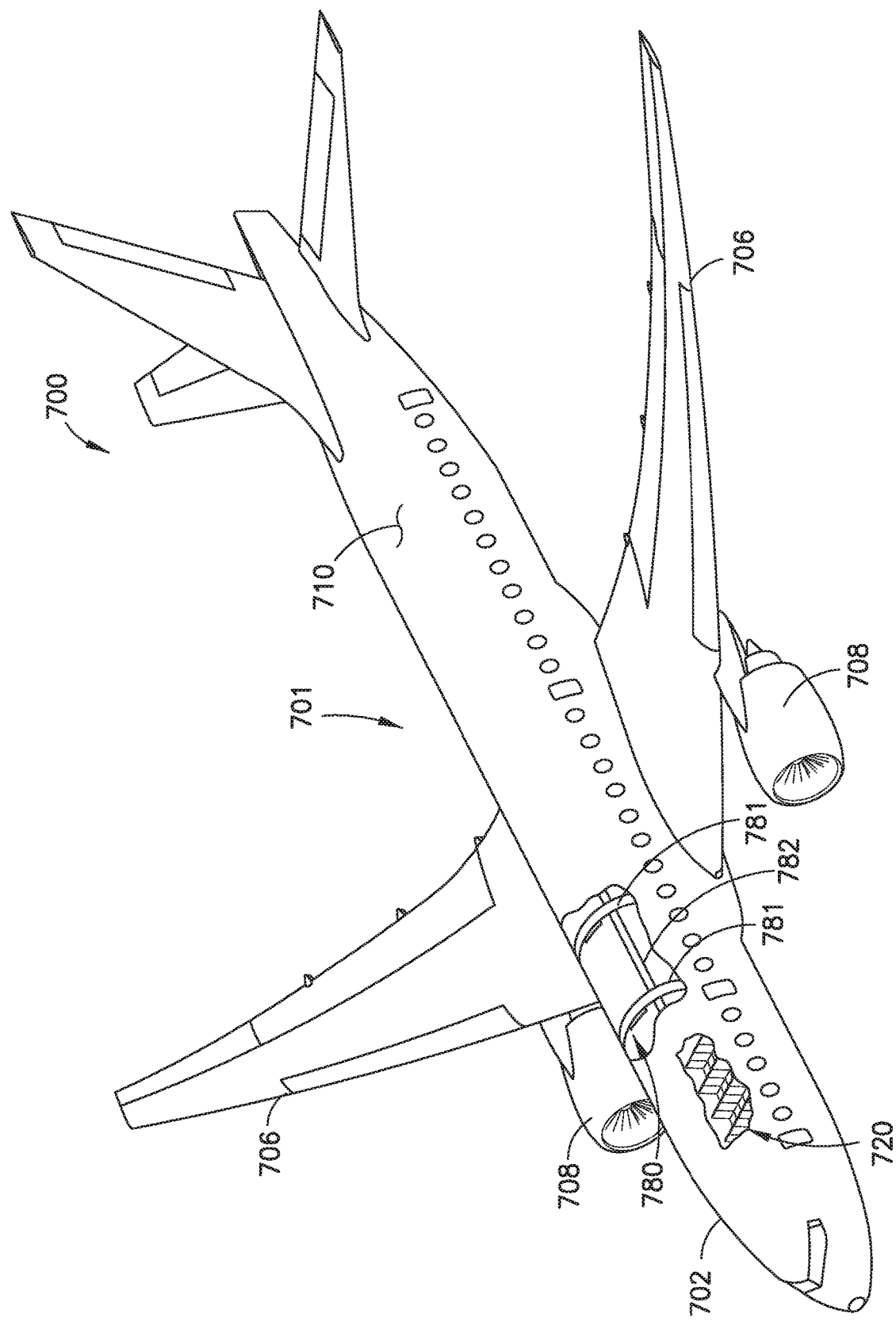
Figure 8:
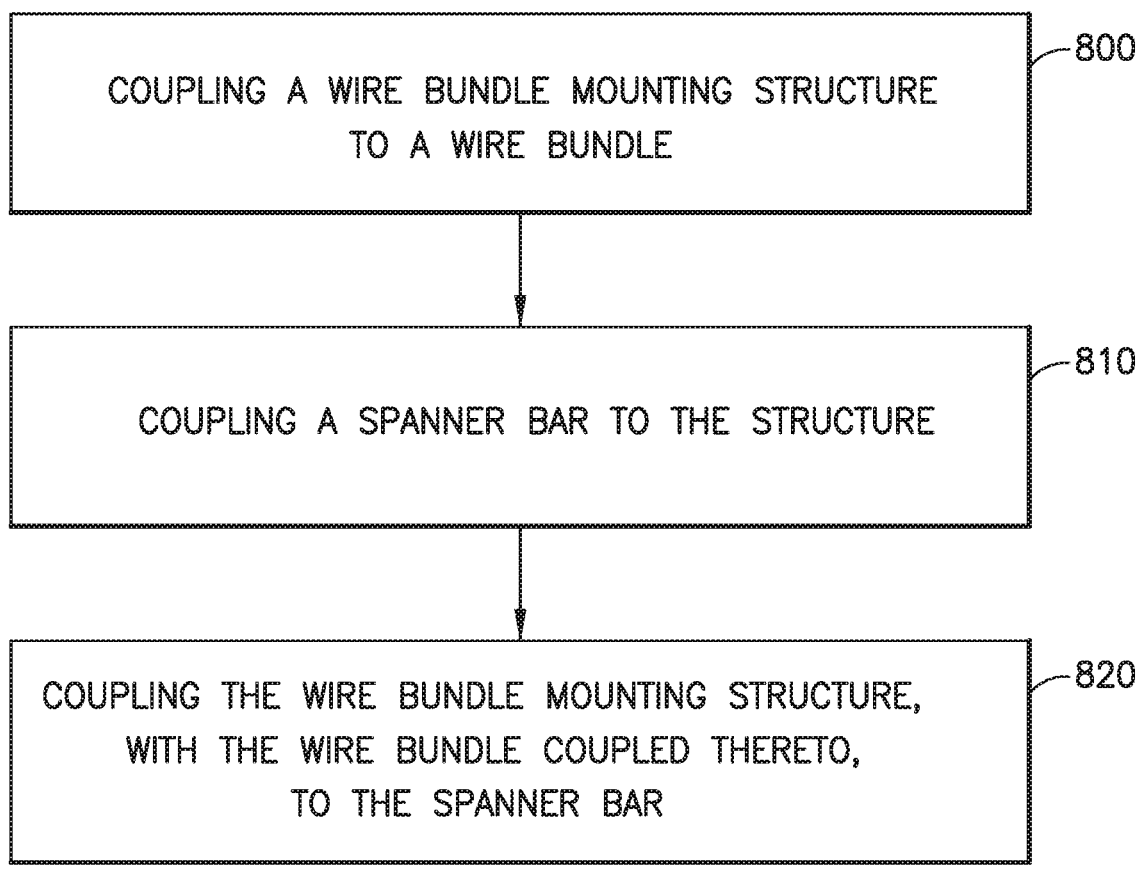
Figure 9:
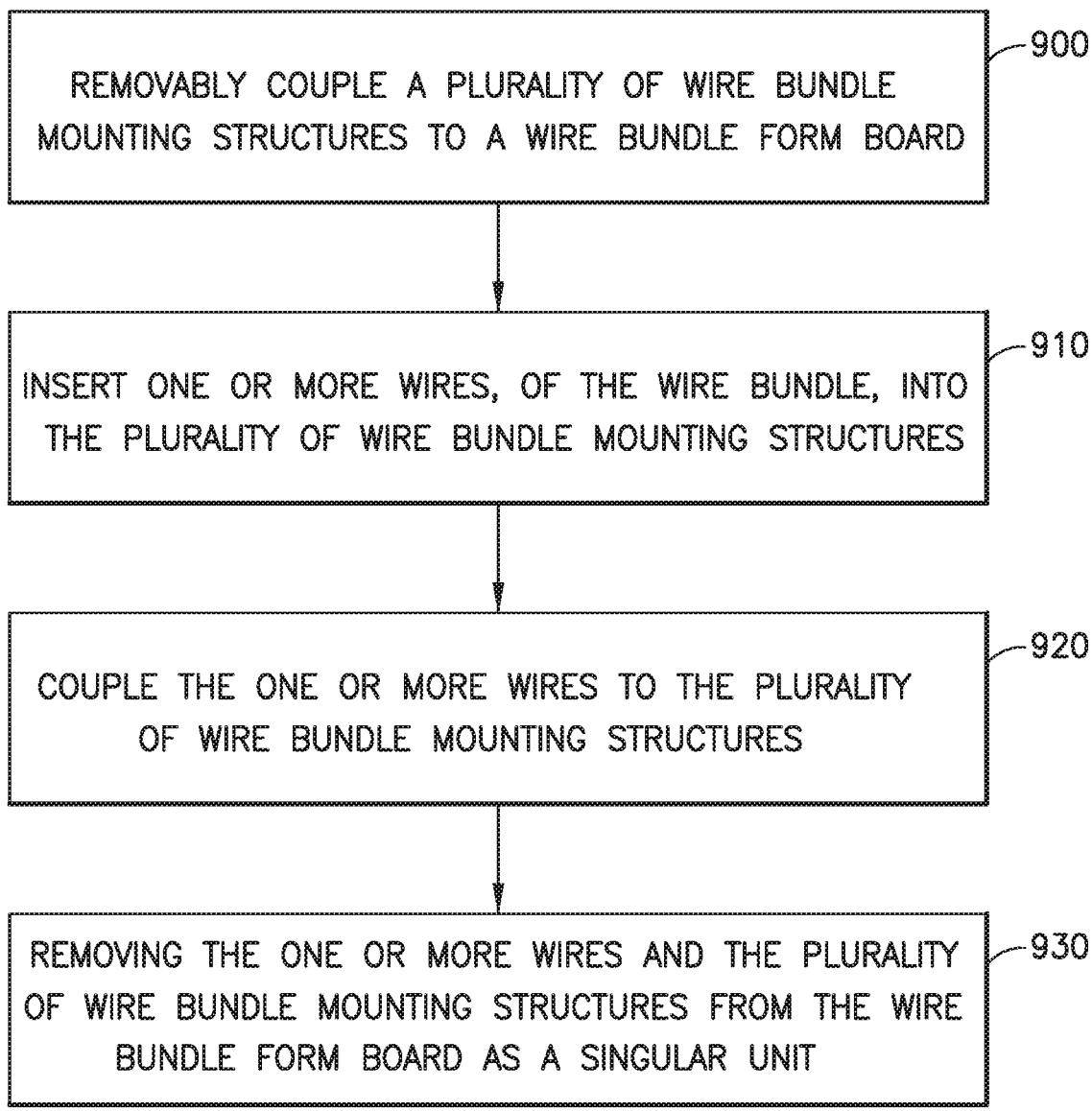
Figure 10:
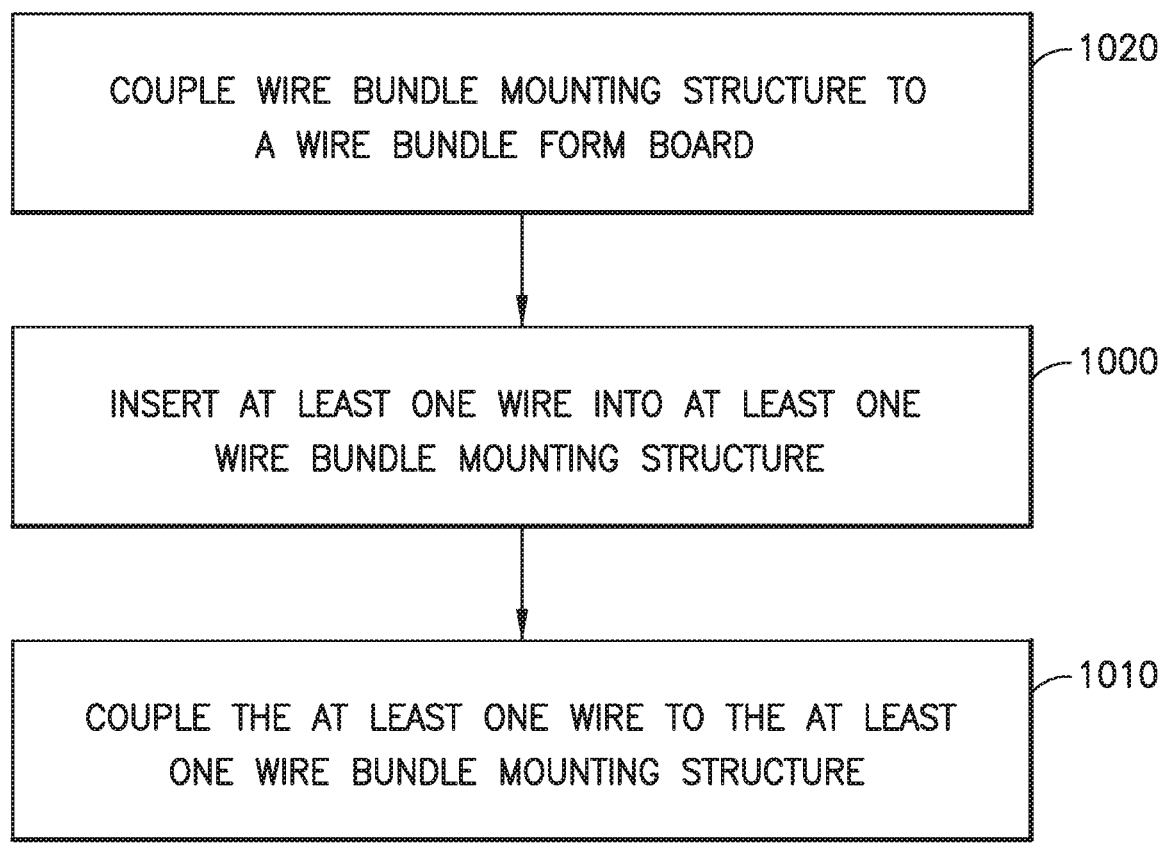

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic isometric illustration of a fixture for coupling a wire bundle to a structure in accordance with aspects of the present disclosure;

FIG. 1A is a schematic isometric illustration of a portion of the fixture for coupling a wire bundle to a structure of FIG. 1 in accordance with aspects of the present disclosure;

FIG. 2A is a schematic isometric illustration of an exemplary wire bundle mounting structure of the fixture of FIG. 1 in accordance with aspects of the present disclosure;

FIG. 2B is a schematic cross-sectional illustration of the exemplary wire bundle mounting structure of FIG. 2A in accordance with aspects of the present disclosure;

FIG. 2C is a schematic illustration of a bottom view of the exemplary wire bundle mounting structure of FIG. 2A in accordance with aspects of the present disclosure;

FIG. 3A is a schematic illustration of a side view of a wire bundle retention strap of the fixture illustrated in FIG. 1 in accordance with aspects of the present disclosure;

FIG. 3B is a schematic illustration of a top view of the wire bundle retention strap of the fixture illustrated in FIG. 1 in accordance with aspects of the present disclosure;

FIG. 4A is a schematic illustration of an exemplary wire bundle coupled to the exemplary wire bundle mounting structure of FIG. 2A in accordance with aspects of the present disclosure;

FIG. 4B is a schematic illustration of an exemplary wire bundle coupled to another exemplary wire bundle mounting structure of FIG. 2A in accordance with aspects of the present disclosure;

FIG. 4C is a schematic illustration of an exemplary wire bundle coupled to the exemplary wire bundle mounting structure of FIG. 4B in accordance with aspects of the present disclosure;

FIG. 5 is a schematic illustration of another exemplary wire bundle mounting structure in accordance with aspects of the present disclosure;

FIG. 6A is a schematic illustration of a wire bundle forming apparatus in accordance with aspects of the present disclosure;

FIG. 6B is a schematic illustration of a portion of the wire bundle forming apparatus in accordance with aspects of the present disclosure;

FIG. 7 is a schematic illustration of an exemplary vehicle including aspects of the present disclosure;

FIG. 8 is a flow diagram of an exemplary method for coupling wire bundles to a structure in accordance with aspects of the present disclosure;

FIG. 9 is a flow diagram of an exemplary method for forming a wire bundle in accordance with aspects of the present disclosure; and FIG. 10 is a flow diagram of an exemplary method for forming a wire bundle in accordance with aspects of the present disclosure.

DETAILED DESCRIPTION

Referring to FIGS. 1, 6A, and 7 the aspects of the present disclosure provide for the formation of wire bundles 600 and the coupling of the wire bundles 600 to a structure 190 where a wire bundle mounting structure 110 is common to both the formation of the wire bundles 600 and the coupling of the wire bundles 600 to the structure 190. The structure may be any suitable structure of, for example, an architectural structure or a vehicle 700 (FIG. 7). The vehicle 700 is illustrated as a fixed wing aircraft 701 having a frame 780, wings 706, and engines 708. The frame 780 includes longitudinally spaced frame members 781 and stringers 782 that form, with an exterior skin 710 of the aircraft 701, a fuselage 702. The fuselage 702 has a cabin area 720. In other aspects, the vehicle 700 may be any suitable maritime vessel, submersible vehicle, fixed wing and/or rotary wing aircraft, terrestrial vehicle (e.g., automobile, armored vehicle, etc.), or extraterrestrial vehicle (e.g., spacecraft, satellite, orbital reentry vehicle, etc.). In one aspect, the wire bundles 600 may be coupled, as described herein, to the longitudinally spaced frame members 781, the stringers 782, or to any other structure of the aircraft 701.

In accordance with the aspects of the present disclosure a wire bundle forming apparatus 610 is provided. The wire bundle forming apparatus includes a wire bundle form board 620 that is reconfigurable for the formation of a number of different wire bundle configurations. The reconfiguration of the wire bundle form board 620 provides a manufacturer the ability to form wire bundles 600 having different configuration with a common wire bundle form board 620. The use of the common wire bundle form board 620 reduces the required storage area allocated for storing the wire bundle form boards 620 within the manufacturing facility.

In accordance with the aspects of the present disclosure a fixture 100 for coupling wire bundles to the structure 190 is also provided. The fixture 100 includes a spanner bar 105 and at least one wire bundle mounting structure 110. The wire bundle mounting structure 110 is coupled to the fixture 100 with "quick connect" mounting features, where the term "quick connect" defines a snap or twist coupling that couples two structures to each other without the use of tools. The fixture 100 provides for a tool-less installation of the wire bundle mounting structure 110, and the wire bundle 600 coupled thereto, to the spanner bar 105 without accessing a back side 189 of the spanner bar 105 (e.g., a side of the spanner bar opposite the wire bundle mounting structure 110). The tool-less installation of the provided for by the fixture 100 may reduce wire bundle installation time and reduce cost of producing the vehicle 700. The installation of the wire bundle mounting structure 110, without back side access, may provide for increased space in which the wire bundles may be placed as the spanner bar 105 may be configured with a reduced height 188 (e.g., so that the wire bundle mounting structure 110 and the wire bundles coupled thereto are disposed closer to the structure 190 than in conventional installations).

As noted above, the wire bundle mounting structure 110 is common to both the fixture 100 and the wire bundle forming apparatus 610. This provides for the formation of a wire bundle 600 with the wire bundle mounting structure 110 and the coupling of the wire bundle 600 to the wire bundle mounting structure 110, where the wire bundle 600 and the wire bundle mounting structure 110 are removed from the wire bundle form board 620 as a single unit for transport to the vehicle 700 and coupling with the spanner bar 105. This again, may reduce installation times and decrease the cost of producing the vehicle 700.

Illustrative, non-exhaustive examples, which may or may not be claimed, of the subject matter according to the present disclosure are provided below.

Referring now to FIGS. 1 and 2A-2C, the fixture 100 includes at least one wire bundle mounting structure 110 and a spanner bar 105. As can be seen in FIG. 1, the at least one wire bundle mounting structure 110 may include a plurality of wire bundle mounting structures 110, 110A, 110B, 110C (generally referred to as wire bundle mounting structures 110). The at least one wire bundle mounting structure 110 includes quick connect mounting features 111 and quick connect strap retention features 120. Each of the at least one wire bundle mounting structure 110 includes a frame 112 having a first mounting structure end 113 and a second mounting structure end 114. The quick connect mounting features 111 include at least one protrusion 115 disposed at each of the first mounting structure end 113 and the second mounting structure end 114. The at least one protrusion 115 of the quick connect mounting features 111 includes at least one first protrusion 115A disposed on one of the first mounting structure end 113 and the second mounting structure end 114. The at least one protrusion 115 of the quick connect mounting features 111 also includes at least one second protrusion 115B disposed on the other of the first mounting structure end 113 and the second mounting structure end 114.

Referring to FIGS. 2A-2C, the quick connect strap retention features 120 includes a guide channel 200 and a cantilevered toothed member 210. The guide channel 200 is formed by the frame 112 and has an open side 201. The cantilevered toothed member 210 is formed by the frame 112 and is disposed at the open side 201 of the guide channel 200. The cantilevered toothed member 210 is resilient so that a free end 211 of the cantilevered toothed member 210 moves in direction 212 relative to the guide channel 200.

The cantilevered toothed member 210 includes directional teeth 215 along at least a portion of the cantilevered toothed member 210.

The at least one wire bundle mounting structure 110 also includes an axle bearing surface 220 and a retention strap aperture 230 through the axle bearing surface 220. Both the axle bearing surface 220 and the retention strap aperture 230 are formed by the frame 112.

Referring to FIGS. 1, 2A, 2B, and 2C, the spanner bar 105 includes a frame 150. The frame 150 is longitudinally extended along a longitudinal axis 151 so as to have a length 155. The frame 150 forms a plurality of wire bundle mounting recesses 170 spaced along the longitudinal length 155 of the spanner bar 105, where each wire bundle mounting recess 170 is configured to couple with a respective one of the plurality of wire bundle mounting structures. Each wire bundle mounting recess 170 is formed at least in part by respective mating quick connect mounting features 156 that mate or otherwise couple with the quick connect mounting features 111 of a respective one of the at least one wire bundle mounting structure 110 for coupling the at least one wire bundle mounting structure 110 to the spanner bar 105. In the example shown in FIG. 1, the spanner bar 105 has the length 155 that accommodates four sets of mating quick connect mounting features 156 for coupling four wire bundle mounting structures 110, 110A, 110B, 110C to the spanner bar 105; however, in other aspects, the length 155 may be any suitable length for accommodating coupling more or less than four wire bundle mounting structures 110, 110A, 110B, 110C to the spanner bar.

The mating quick connect mounting features 156 include flexure members 157 and recesses 158. The flexure members 157 are configured to snap over and retain the at least one first protrusion 115A. For example, flexure members 157 include a ramped engagement surface 159 and a retention surface 160 (see FIGS. 1 and 4A). The recess 158 is configured to receive the at least one second protrusion 115B, where the coupling between the recess 158 and the at least one second protrusion 115B forms a fulcrum 182 (e.g., pivot point—see FIGS. 1 and 4A) of the quick connect mounting features 111 when the respective wire bundle mounting structure 110 is being inserted into the wire bundle mounting recess 170. For example, to insert a wire bundle mounting recess 170 into a wire bundle mounting recess 170 the at least one second protrusion 115B is inserted into the recess 158 and the second mounting structure end 114 is pivoted about the fulcrum 182 so that the at least one first protrusion 115A contacts the flexure members 157. The contact between the at least one first protrusion 115A and the ramped engagement surface 159 causes the flexure members 157 to flex in direction 163 (FIG. 4A) and allow passage of the at least one wire bundle mounting structure 110 into the respective wire bundle mounting recess so that once the retention surface 160 of the flexure members 157 passes the at least one first protrusion, the flexure members 157 returns (e.g., snaps back) to its original, un-flexed, position and the retention surface 160 couples with engagement surface 161 so that the recess 158 and the retention surface 160 retain the wire bundle mounting structure 110 within the wire bundle mounting recess 170. The wire bundle mounting structure 110 may be removed from the wire bundle mounting recess 170 in substantially the reverse manner to that described above, where the flexure members 157 are manually flexed away from the at least one first protrusion 115A to release the at least one first protrusion 115A (e.g., the retention surface 160 and the engagement surface 161 are decoupled) and allow rotation of the wire bundle mounting structure 110, about the fulcrum 182, away from the spanner bar 105. As described above, the quick connect mounting features 111 of the at least one wire bundle mounting structure 110 and the mating quick connect mounting features 156 of the spanner bar 105 are configured so that the at least one wire bundle mounting structure 110 is coupled to the spanner bar 105 with single side spanner bar access (i.e., the side of the spanner bar 105 opposite the structure 190 as shown in FIG. 1).

While the quick connect features 111 and mating quick connect features 156 are described as "snap" connectors, in other aspects any suitable quick connect coupling may be used. For example, as can be seen in FIG. 1A, the at least one wire bundle mounting structure 110 may include a quarter turn threaded stud 103 that interfaces with a respective quarter turn threaded aperture 104 of the spanner bar 105. The spanner bar may include a protrusion or detent mechanism 102 that substantially prevents rotation of the at least one wire bundle mounting structure 110 in a direction 119 opposite an installation rotation direction 118 to substantially prevent unintentional de-coupling of the at least one wire bundle mounting structure 110 from the spanner bar 105.

Referring to FIGS. 1 and 4A, each wire bundle mounting recess 170 includes a wire bundle mounting structure support surface 140 that is configured to couple with a bottom surface 250 of a respective wire bundle mounting structure 110. At least one of the wire bundle mounting structure support surface 140 being disposed along a different plane than another one of the wire bundle mounting structure support surface 140 of another wire bundle mounting recess 170. For example, the distance 195 (FIG. 1) between the at least one wire bundle mounting structure support surface 140 and a mounting surface 197 of the spanner bar 105 is different than a distance 196 between another one of the wire bundle mounting structure support surface 140 and the mounting surface 197 of the spanner bar 105. Placing the wire bundle mounting structures 110 on different planes may provide for spacing between the wire bundles 600 coupled thereto. It is noted that the mounting surface 197 of the spanner bar 105 is illustrated in FIG. 1 as being substantially straight, but in other aspects the mounting surface 197 may have any suitable contour that substantially matches a surface of the structure 190 to which the spanner bar 105 is to be coupled.

Referring to FIG. 1, in another aspect, the fixture 100 includes at least one spacer 130 that is configured to increase, for example, one or more of the distance 195, 196. The spacer 130 includes a spanner bar coupling 131 that is substantially similar to the quick connect mounting features 111 of the wire bundle mounting structures 110. The spacer 130 also includes a mounting structure coupling 132 that is substantially similar to the mating quick connect mounting features 156 of the spanner bar 105. The spacer 130 may have any suitable height 138 for placing a wire bundle mounting structure 110 coupled thereto at a desired height relative to other wire bundle mounting structures 110 coupled to the spanner bar 105. In one aspect, the spacer 130 may be selectable from a number of different spacers 130, 130A, 130B, one or more of which has a different height 138 than other ones of the different spacers 130, 130A, 130B.

Referring to FIG. 1, the spanner bar 105 includes one or more mounting features 165 configured to couple the spanner bar 105 to the structure 190. The one or more mounting features 165 include one or more of apertures (through which mechanical fasteners 166, 167 are inserted), snaps 168, or any other suitable mechanical fasteners (such as quick connect couplings substantially similar to those between the spanner bar 105 and the wire bundle mounting structures 110). The at least one wire bundle mounting structure 110 is longitudinally spaced along the spanner bar 105 so that the one or more mounting features 165 are accessible between adjacent wire bundle mounting structures 110.

Referring to FIGS. 3A, 3B, and 4A, the fixture 100 also includes a wire bundle retention strap 300. The wire bundle retention strap 300 includes a first end 301 and a second end 302. A pivot axle 310 is disposed at the first end 301 and a strap portion 320 extends from the pivot axle 310 to form the second end 302. The first end 301 is configured to pivotally couple to the at least one wire bundle mounting structure 110. For example, referring also to FIGS. 2B and 2C, the retention strap aperture 230 is configured to receive the strap portion 320 of the wire bundle retention strap 300 and the axle bearing surface 220 couples with the pivot axle 310 so as to prevent passage of the pivot axle 310 through the retention strap aperture 230. The second end 302 includes mating quick connect strap retention features 305 that mate with the quick connect strap retention features 120 of the at least one wire bundle mounting structure 110 to couple the second end 302 to the at least one wire bundle mounting structure 110.

As can be seen in FIG. 4A, the first end 301 of the wire bundle retention strap 300 is pivotally coupled to the respective wire bundle mounting structure 110 adjacent the first mounting structure end 113 so that the wire bundle retention strap 300 extends from the retention strap aperture 230 around a wire bundle 600 being coupled to the wire bundle mounting structure 110 by the wire bundle retention strap 300. Here the wire bundle retention strap 300 and a wire bundle interface surface 125 of the at least one wire bundle mounting structure 110 form a wire bundle passage loop 450 through which one or more wire bundles extend 600. The wire bundle interface surface 125 forms a wire receiving portion 126 (FIG. 4A) in which wires 601 (FIG. 4A), forming the wire bundle 600, are placed and coupled to the at least one wire bundle mounting structure 110. The mating quick connect strap retention features 305 extend along a predetermined length of the wire bundle retention strap 300 so that the wire bundle passage loop has a variably sized wire passage aperture 451 (noting FIG. 4A illustrates a larger wire passage aperture 451 and a smaller wire passage aperture) that may depend on a cross-sectional size of the wire bundle 600 being coupled to the respective wire bundle mounting structure by the wire bundle retention strap 300. The variably sized wire passage aperture 451 provides for coupling wire bundles 600 of varying cross-section (e.g., from a single wire to a wire bundle of any suitable size having any suitable number of wires therein) to the at least one wire bundle mounting structure 110.

To form the wire bundle passage loop 450 the second end 302 of the wire bundle retention strap 300 is coupled to the respective wire bundle mounting structure 110 by the quick connect strap retention features 120 adjacent the second mounting structure end 114. For example, the quick connect strap retention features 120 couple with the mating quick connect strap retention features 305 as the second end 302 is pulled through the guide channel 200. The quick connect strap retention features 120 and the mating quick connect strap retention features 305 form a ratchet coupling 470 that is configured so that the wire bundle retention strap 300 passes through the quick connect strap retention features 120 in a single non-reversible direction 490.

As noted above, the at least one wire bundle mounting structure 110 may include a plurality of wire bundle mounting structures 110, 110A, 110B, 110C. In one aspect, one or more of the wire bundle mounting structures 110, 110A, 110B, 110C may be different (e.g., have different predetermined characteristics) than another of the plurality of wire bundle mounting structures 110, 110A, 110B, 110C. Here, the at least one wire bundle mounting structure 110 is selectable from a number of different wire bundle mounting structures 110, 110A, 110B, 110C, where at least one of the different wire bundle mounting structures 110, 110A, 110B, 110C has a different wire bundle interface surface 125 (e.g., a different predetermined characteristic) than another of the different wire bundle mounting structures 110, 110A, 110B, 110C. For example, the wire bundle interface surface 125 of wire bundle mounting structure 110 may be different (e.g., have a larger or smaller radius) than the wire bundle interface surface 125 of the wire bundle mounting structure 110A. Referring to FIGS. 4B and 4C, one or more of the wire bundle mounting structures 110 may be configured with a different wire bundle retention strap guide channel 410 (e.g., a different predetermined characteristic) for use with a conventional tie wrap 400. For example, 110E the wire bundle retention strap guide channel 410 may be a tooth-less passage through which the tie wrap 400 is inserted where the ends of the tie wrap 400 are coupled in a conventional manner.

Referring to FIG. 5 the at least one of the wire bundle mounting structure 110 includes stackable coupling features (e.g., a different predetermined characteristic) substantially similar to that of the spacer 130. For example, wire bundle mounting structure 110D is substantially similar to the wire bundle mounting structures described above; however, in this aspect the wire bundle mounting structure 110D includes a stanchion portion 500 that includes stackable coupling features 532 that are configured to couple at least two wire bundle mounting structures to each other in a stacked configuration (in FIG. 5 wire bundle mounting structures 110D and 110A are coupled to each other). The stackable coupling features 532 are substantially similar to the mounting structure coupling 132 of the spacer 130 described above. The wire bundle mounting structure 110D may also include a pivoting support member 520 coupled to the frame 512 of the wire bundle mounting structure 110D. The pivoting support member 520 may pivot in direction 560 so as to couple with a detent 530 or other structure of the stanchion portion 500 to provide structural support to the stanchion portion 500. The pivoting support member 520 may be coupled with the detent 530 after the wire bundle is coupled to the wire bundle mounting structure 110D in the manner described herein.

For exemplary purposes, the wire bundle retention strap 300 comprises a nylon material. In other aspects, the wire bundle retention strap 300 comprises a cross-linked polytetrafluoroethylene material. Also for exemplary purposes, one or more of the wire bundle mounting structure 110 and the spanner bar 105 comprise a metal. In other aspects, one or more of the wire bundle mounting structure 110 and the spanner bar 105 comprise a plastic material. In still other aspects, one or more of the wire bundle mounting structure 110 and the spanner bar 105 comprise a composite material. In other aspects, the wire bundle retention strap 300, the wire bundle mounting structure 110, and the spanner bar 105 may be constructed of any suitable material(s).

Figure 6:
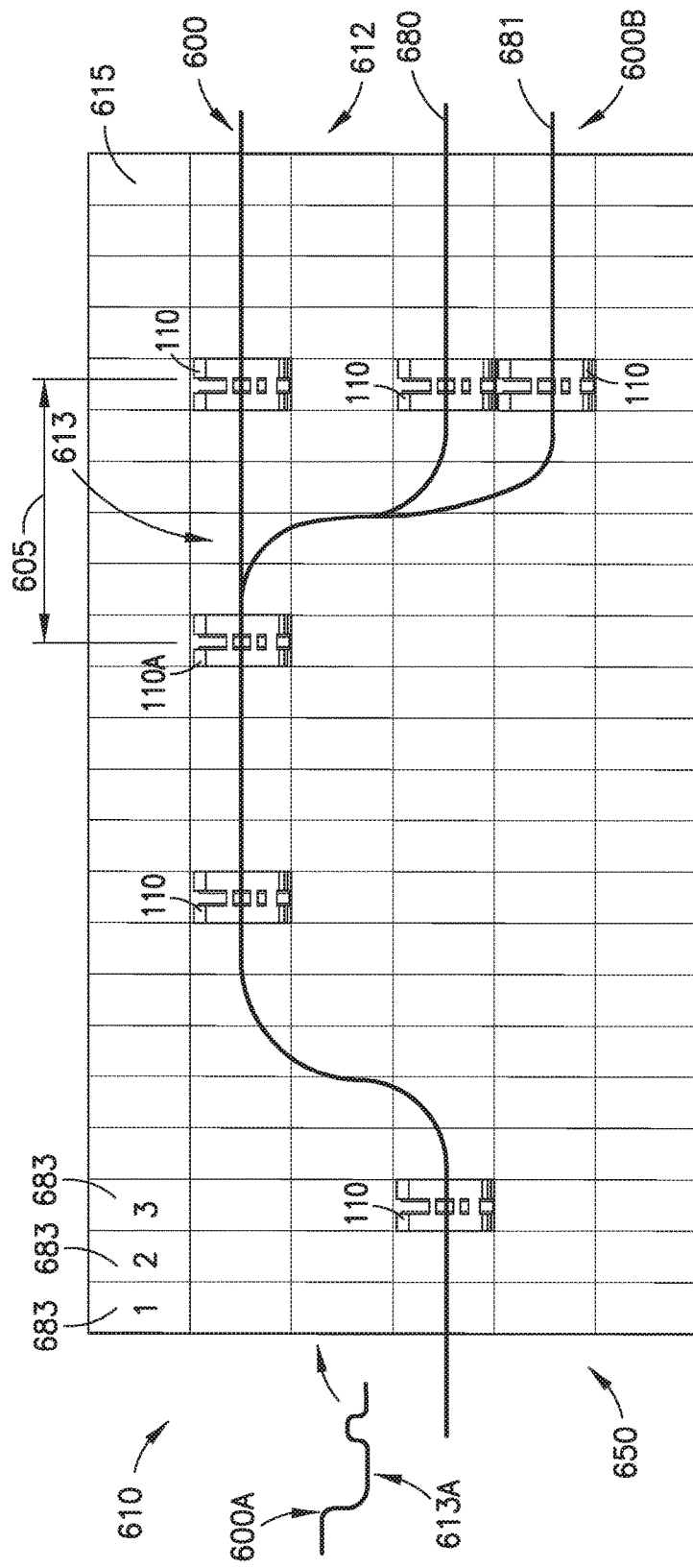

Referring to FIG. 6, the at least one wire bundle mounting structure 110 described herein may also form part of the wire bundle forming apparatus 610. The wire bundle forming apparatus includes a wire bundle form board 620 having a plurality of mounting structure couplings 615 and at least one wire bundle mounting structure 110 configured to couple with the plurality of mounting structure couplings 615 for removably coupling the at least one wire bundle mounting structure 110 to the wire bundle form board 620 in a predetermined pattern 612 corresponding to a predetermined configuration 613 of the wire bundle 600. The at least one wire bundle mounting structure 110 is common to both (1) arranging the at least one wire 601 (FIG. 4A) in the predetermined configuration 613 for the formation of the wire bundle 600, and, (2) when removed from the wire bundle form board 620 with the wire bundle 600 coupled to the at least one wire bundle mounting structure 110, the fixture 100 for coupling the wire bundle 600 to the structure 190.

In a manner similar to that described above with respect to the spanner bar 105, the quick connect mounting features 111 of the at least one wire bundle mounting structure 110 and the plurality of mounting structure couplings 615 of the wire bundle form board 620 are configured so that the at least one wire bundle mounting structure 110 is coupled to wire bundle form board 620 with single side form board access. For example, referring to FIG. 6B, each of the plurality of mounting structure couplings 615 (one of which is shown in FIG. 6B) of the wire bundle form board 620 are substantially similar to the mating quick connect mounting features 156 of the spanner bar 105. Here, the plurality of mounting structure couplings 615 form a plurality of wire bundle mounting recesses 170 that are arranged in a grid 650 where each wire bundle mounting recess 170 is configured to couple with a respective one of the plurality of wire bundle mounting structures 110 in the manner described above with respect to the spanner bar 105. The wire bundle mounting structure support surface 140 of the mounting structure couplings 615 may be disposed a distance 690 from a surface 691 of the form board to provide access to, for example, the wire bundle retention strap 300 (see also FIG. 4A) for pulling the second end 302 of the wire bundle retention strap 300 to couple the wire bundle 600 to the wire bundle mounting structures 110. The mounting structure couplings 615 may also include a channel 673 (the spanner bar 105 may include a similar channel—see FIGS. 1 and 4A) through which at least a portion of the wire bundle retention strap 300 passes so that an operator may pull the wire bundle retention strap 300 to couple the wire bundle 600 to the wire bundle mounting structures 110.

The wire bundle forming apparatus 610 may also include any suitable robot 660 configured to at least couple the at least one wire bundle mounting structure 110 to the wire bundle form board 620 in the predetermined pattern 612. For example, the robot 660 may include any suitable transport arm 661 having a gripper 662 that picks up wire bundle mounting structures 110 from a storage location, transports the wire bundle mounting structures 110 to the wire bundle form board 620, and couples the wire bundle mounting structures 110 (carried by the gripper 662) to predetermined mounting structure couplings 615 of the wire bundle form board 620. The robot 660 may include any suitable machine vision system 663 and/or location sensors 664 for identifying the predetermined mounting structure couplings 615 and coupling wire bundle mounting structures 110 to the predetermined mounting structure couplings 615.

As described above, the form board is reconfigurable so that wire bundles having different configurations may be formed with a common wire bundle form board 620. The robot 660 includes a memory in which the different configurations of the wire bundles are stored. The memory may also include any suitable non-transitory computer program code corresponding to the different wire bundle configurations so that a controller 666 of the robot 660 may send instructions to the transport arm 661 for placing the wire bundle mounting structures 110 on the wire bundle form board in a predetermined pattern 612 that corresponds with a selected one of the wire bundle configurations.

Referring now to FIGS. 1, 3A, 3B, 4A, and 8, an exemplary method of coupling wire bundles 600 to a structure 190 will be described. A wire bundle mounting structure 110 is coupled to a wire bundle 600 (FIG. 8, Block 800) with a wire bundle retention strap 300 extending through the wire bundle mounting structure 110, where the wire bundle retention strap 300 has a first end 301 pivotally coupled to a frame 112 of the wire bundle mounting structure 110, and a second end 302 having mating quick connect strap retention features 305 that mate with quick connect strap retention features 120 of the wire bundle mounting structure 110. Here the wire bundle retention strap 300 is inserted through the wire bundle mounting structure 110 at opposite ends (e.g., the first mounting structure end 113 and the second mounting structure end 114) of the wire bundle mounting structure 110 to form a wire bundle passage loop 450. A size of the wire bundle passage loop 450 formed by the wire bundle retention strap 300 and the wire bundle mounting structure 110 is adjusted by pulling the second end 302 of the wire bundle retention strap 300 through the wire bundle mounting structure 110. Coupling the wire bundle mounting structure 110 to a wire bundle 600 includes inserting the wire bundle 600 into the wire bundle mounting structure 110, such as into the wire receiving portion 126 (FIGS. 1 and 4A), and coupling the wire bundle 600, disposed within the wire bundle mounting structure 110, to the wire bundle mounting structure 110 with the wire bundle retention strap 300.

Block 800 of FIG. 8 may be repeated any suitable number of times depending on the predetermined configuration 613 of the wire bundle 600. For example, another wire bundle mounting structure 110 may be coupled to the wire bundle 600 with another wire bundle retention strap 300 extending through the other wire bundle mounting structure 110, where the wire bundle mounting structure 110 and the other wire bundle mounting structure 110A are spaced a predetermined distance 605 from each other along a length of the wire bundle 600. The predetermined distance 605 may correspond to a distance between frame longitudinally spaced members 781 (or any other suitable features, such as the stringers 782, etc.) of the frame 780 of fuselage 702 (see FIG. 7).

A spanner bar 105 is coupled to the structure 190 (FIG. 8, Block 810) such as with any suitable mechanical fasteners as described above. The wire bundle mounting structure 110, with the wire bundle 600 coupled thereto, is coupled to the spanner bar 105 (FIG. 8, Block 820), where the wire bundle mounting structure 110 is coupled to a wire bundle mounting recesses 170 of the spanner bar 105 with quick connect mounting features 156 of the spanner bar 105 that mate the quick connect mounting features 111 of the wire bundle mounting structure 110. In one aspect, depending on, e.g., a length of the wire bundle, another spanner bar 105A (FIG. 1) is coupled to the structure 190, where the spanner bar 105 and the other spanner bar 105A are spaced from each other by the predetermined distance 605. Here, each of the wire bundle mounting structure 110 and the other wire bundle mounting structure 110A, with the wire bundle 600 coupled thereto, are coupled to a respective one of the spanner bar 105 and the other spanner bar 105A. In one aspect, one wire bundle mounting structure 110 may be coupled to another wire bundle mounting structure 110D (FIG. 5) and/or a spacer 130 (FIG. 1) in a stacked arrangement.

Referring to FIGS. 1, 4A, 6 and 9, an exemplary method of forming a wire bundle will be described. A plurality of wire bundle mounting structures 110 are removably coupled to a wire bundle form board 620 (FIG. 9 Block 900). The plurality of wire bundles mounting structures 110 are coupled to the wire bundle form board 620 in a predetermined pattern 612 corresponding to a configuration (e.g., shape, wire routing, etc.) 613 of the wire bundle 600. In one aspect, the wire bundle mounting structures 110 are removably coupled to the wire bundle form board 620 with a robotic automation (e.g., robot 660). In other aspects, the wire bundle mounting structures 110 are removably coupled to the wire bundle form board 620 manually. The wire bundle mounting structures 110 are removably coupled to the wire bundle form board 620 according to indicia 683 (e.g., numbers, patterns, colors, lights, etc.), disposed on the wire bundle form board 620, specifying placement locations of the wire bundle mounting structures 110 for a predetermined wire bundle 600 configuration 613. As noted above, the wire bundle form board 620 is common to a first wire bundle 600 and a second wire bundle 600A (FIG. 6), where the second wire bundle 600A has a different configuration 613A than the first wire bundle 600.

One or more wires 601 (FIG. 4A), of the wire bundle 600, are inserted into the plurality of wire bundle mounting structures 110 (FIG. 9, Block 910). The one or more wires 601 are coupled to the plurality of wire bundle mounting structures 110 (FIG. 9, Block 920) with a respective wire bundle retention strap 300 of each of the plurality of wire bundle mounting structures 110 so as to form the wire bundle 600. The respective wire bundle retention strap 300 is inserted into a respective wire bundle mounting structure 110, where the respective wire bundle retention strap 300 has a first end 301 pivotally coupled to a frame 112 of the respective wire bundle mounting structure 110, and a second end 302 having mating quick connect strap retention features 305 that mate with quick connect strap retention features 120 of the respective wire bundle mounting structure 110. The respective wire bundle retention strap 300 is inserted through the respective wire bundle mounting structure 110 at opposite ends (e.g., first mounting structure end 113 and second mounting structure end 114) of the respective wire bundle mounting structure to form a wire bundle passage loop 450. A size of the wire bundle passage loop 450 formed by the respective wire bundle retention strap 300 and the respective wire bundle mounting structure 110 is adjusted by pulling the second end 302 of the wire bundle retention strap 300 through the respective wire bundle mounting structure 110.

The one or more wires 601 and the plurality of wire bundle mounting structures 110 are removed from the wire bundle form board 620 as a singular unit (FIG. 9, Block 930). In one aspect, another plurality of wire bundle mounting structures 110 may be coupled in a stacked arrangement (in the manner described above) to at least some of the plurality of wire bundle mounting structures 110 coupled to the wire bundle form board 620. One or more different wires 680, 681 may be inserted into the other plurality of wire bundle mounting structures 110 and the one or more different wires 680, 681 are coupled to the other plurality of wire bundle mounting structures 110 so as to form another wire bundle 600B (FIG. 6A) that is stacked on the wire bundle 600 (referred to as the first wire bundle). The first wire bundle 600 and the other wire bundle 600B are removed from the wire bundle form board 620 as the singular unit.

Referring to FIGS. 1, 4A, 6, and 10 another exemplary method for forming a wire bundle 600 will be described. At least one wire 601 (FIG. 4A) is inserted into at least one wire bundle mounting structure 110 (FIG. 10, Block 1000). The at least one wire 601 is coupled to the at least one wire bundle mounting structure 110 (FIG. 10, Block 1010) with a respective wire bundle retention strap 300 extending through a respective wire bundle mounting structure 110. The respective wire bundle retention strap 300 is inserted into the respective wire bundle mounting structure 110, where each wire bundle retention strap 300 has a first end 301 pivotally coupled to a frame 112 of the respective wire bundle mounting structure 110, and a second end 302 having mating quick connect strap retention features 305 that mate with quick connect strap retention features 120 of the respective wire bundle mounting structure 110. The respective wire bundle retention strap 300 is inserted through the respective wire bundle mounting structure 110 at opposite ends (e.g., the first mounting structure end 113 and the second mounting structure end 114) of the respective wire bundle mounting structure 110 to form a wire bundle passage loop 450. A size of the wire bundle passage loop 450 formed by the respective wire bundle retention strap 300 and the respective wire bundle mounting structure 110 is adjusted by pulling the second end 302 of the wire bundle retention strap 300 through the respective wire bundle mounting structure 110. The at least one wire bundle mounting structure 110 is common to both arranging the at least one wire 601 in a predetermined configuration 613 for the formation of the wire bundle 600, and mounting the wire bundle 600 to a structure 190.

The at least one wire bundle mounting structure 110, with the at least one wire 601 coupled thereto, is coupled to at least one spanner bar 105, where the at least one wire bundle mounting structure 110 is coupled to a respective wire bundle mounting recesses 170 of a respective spanner bar 105 with quick connect mounting features 156 of the respective spanner bar 105 that mate the quick connect mounting features 111 of the at least one wire bundle mounting structure 110.

The at least one wire bundle mounting structure 110 may be removably coupled to a wire bundle form board 620 (FIG. 10, Block 1020) in a predetermined pattern 612 corresponding to a configuration 613 (shape, routing or wires, etc.) of the wire bundle 600. In one aspect, the at least one wire bundle mounting structure 110 is removably coupled to the wire bundle form board 620 with a robotic automation (e.g., robot 660); while in other aspects the wire bundle mounting structure may be removably coupled to the wire bundle form board 620 manually. The at least one wire bundle mounting structure is removably coupled to the wire bundle form board according to indicia, disposed on the wire bundle form board, specifying placement locations of the wire bundle mounting structures for a predetermined wire bundle. The wire bundle form board 620 is common to a first wire bundle 600 and a second wire bundle 600A, where the second wire bundle 600A has a different configuration than the first wire bundle 600.

The following examples are provided in accordance with the aspects of the present disclosure:

A1. A fixture for coupling wire bundles to a structure, the fixture comprising:

at least one wire bundle mounting structure, the at least one wire bundle mounting structure having quick connect mounting features, and quick connect strap retention features;

a spanner bar having mating quick connect mounting features that mate with the quick connect mounting features of the at least one wire bundle mounting structure for coupling the at least one wire bundle mounting structure to the spanner bar; and a wire bundle retention strap having a first end pivotally coupled to the at least one wire bundle mounting structure, and a second end having mating quick connect strap retention features that mate with the quick connect strap retention features of the at least one wire bundle mounting structure to couple the second end to the at least one wire bundle mounting structure.

A2. The fixture of paragraph A1, wherein:

the wire bundle retention strap includes a pivot axle and a strap portion extending from the pivot axle, and the at least one wire bundle mounting structure includes an axle bearing surface and a retention strap aperture through the axle bearing surface, the retention strap aperture being configured to receive the strap portion of the wire bundle retention strap and the axle bearing surface couples with the pivot axle so as to prevent passage of the pivot axle through the retention strap aperture.

A3. The fixture of paragraph A1, wherein the wire bundle retention strap and the at least one wire bundle mounting structure form a wire bundle passage loop through which one or more wire bundles extend.

A4. The fixture of paragraph A3, wherein the mating quick connect strap retention features extend along a predetermined length of the wire bundle retention strap so that the wire bundle passage loop has a variably sized wire passage aperture.

A5. The fixture of paragraph A1, where the quick connect strap retention features and the mating quick connect strap retention features form a ratchet coupling.

A6. The fixture of paragraph A5, wherein the ratchet coupling is configured so that the wire bundle retention strap passes through the quick connect strap retention features in a single non-reversible direction.

A7. The fixture of paragraph A1, wherein the quick connect strap retention features comprise:

a guide channel having an open side; and a cantilevered toothed member disposed at the open side of the guide channel.

A8. The fixture of paragraph A7, wherein the cantilevered tooth member is resilient so that a free end of the cantilevered tooth member moves relative to the guide channel.

A9. The fixture of paragraph A1, wherein:

the quick connect mounting features of the at least one wire bundle mounting structure include at least one first protrusion; and the mating quick connect mounting features include flexure members configured to snap over and retain the at least one first protrusion.

A10. The fixture of paragraph A1, wherein:

the quick connect mounting features of the at least one wire bundle mounting structure include at least one second protrusion; and the mating quick connect mounting features of the spanner bar include a recess into which the at least one second protrusion is received, where the coupling between the recess and the at least one second protrusion forms a fulcrum of the quick connect mounting features.

A11. The fixture of paragraph A1, wherein:
each of the at least one wire bundle mounting structure includes a frame having a first mounting structure end and a second mounting structure end; and
the quick connect mounting features include at least one protrusion disposed at each of the first mounting structure end and the second mounting structure end.

A12. The fixture of paragraph A11, wherein:
the first end of the wire bundle retention strap is pivotally coupled to a respective wire bundle mounting structure adjacent the first mounting structure end; and
the second end of the wire bundle retention strap is coupled to the respective wire bundle mounting structure (by the quick connect strap retention features) adjacent the second mounting structure end.

A13. The fixture of paragraph A1, wherein:
the at least one wire bundle mounting structure includes a plurality of wire bundle mounting structures; and
the quick connect mounting features form a plurality of wire bundle mounting recesses, the plurality of wire bundle mounting recesses being spaced along a longitudinal length of the spanner bar where each wire bundle mounting recess is configured to couple with a respective one of the plurality of wire bundle mounting structures.

A14. The fixture of paragraph A13, wherein each wire bundle mounting recess includes a wire bundle mounting structure support surface, at least one of the wire bundle mounting structure support surface being disposed along a different plane than another one of the wire bundle mounting structure support surface of another wire bundle mounting recess.

A15. The fixture of paragraph A1, wherein the spanner bar includes one or more mounting features configured to couple the spanner bar to the structure.

A16. The fixture of paragraph A15, wherein the one or more mounting features include one or more of apertures and snaps.

A17. The fixture of paragraph A15, wherein the one or more mounting features include mechanical fasteners.

A18. The fixture of paragraph A15, wherein the structure is a frame of an aircraft.

A19. The fixture of paragraph A15, wherein the at least one wire bundle mounting structure is longitudinally spaced along the spanner bar so that the one or more mounting features are accessible between adjacent wire bundle mounting structures.

A20. The fixture of paragraph A1, wherein at least one of the wire bundle mounting structure includes stackable coupling features, the stackable coupling features being configured to couple at least two wire bundle mounting structures to each other in a stacked configuration.

A21. The fixture of paragraph A1, wherein the quick connect mounting features of the at least one wire bundle mounting structure and the mating quick connect mounting features of the spanner bar are configured so that the at least one wire bundle mounting structure is coupled to the spanner bar with single side spanner bar access.

A22. The fixture of paragraph A1, where the at least one wire bundle mounting structure is selectable from a number of different wire bundle mounting structures, at least one of which has a different wire bundle interface surface than another of the different wire bundle mounting structures.

A23. The fixture of paragraph A1, wherein the wire bundle retention strap comprises a nylon material.

A24. The fixture of paragraph A1, wherein the wire bundle retention strap comprises a cross-linked polytetrafluoroethylene material.

A25. The fixture bar of paragraph A1, wherein one or more of the wire bundle mounting structure and the spanner bar comprise a metal.

A26. The fixture of paragraph A1, wherein one or more of the wire bundle mounting structure and the spanner bar comprise a plastic material.

A27. The fixture of paragraph A1, wherein one or more of the wire bundle mounting structure and the spanner bar comprise a composite material.

B1. A fixture for coupling wire bundles to a structure, the fixture comprising:
a plurality of wire bundle mounting structures, each wire bundle mounting structure including
a frame,
quick connect mounting features coupled to the frame,
quick connect strap retention features coupled to the frame,
a wire bundle retention strap having a first end pivotally coupled to the frame, and a second end having mating quick connect strap retention features that mate with the quick connect strap retention features; and
a longitudinally extended spanner bar having a plurality of wire bundle mounting recesses spaced along a longitudinal length of the spanner bar, each wire bundle mounting recess including mating quick connect mounting features that mate the quick connect mounting features of a respective wire bundle mounting structure for coupling the at least one wire bundle mounting structure to the spanner bar.

B2. The fixture of paragraph B2, wherein:
the wire bundle retention strap includes a pivot axle and a strap portion extending from the pivot axle, and
the at least one wire bundle mounting structure includes an axle bearing surface and a retention strap aperture through the axle bearing surface, the retention strap aperture being configured to receive the strap portion of the wire bundle retention strap and the axle bearing surface couples with the pivot axle so as to prevent passage of the pivot axle through the retention strap aperture.

B3. The fixture of paragraph B1, wherein the wire bundle retention strap and the frame form a wire bundle passage loop through which one or more wire bundles extend.

B4. The fixture of paragraph B3, wherein the mating quick connect strap retention features extend along a predetermined length of the wire bundle retention strap so that the wire bundle passage loop has a variably sized wire passage aperture.

B5. The fixture of paragraph B1, where the quick connect strap retention features and the mating quick connect strap retention features form a ratchet coupling.

B6. The fixture of paragraph B5, wherein the ratchet coupling is configured so that the wire bundle retention strap passes through the quick connect strap retention features in a single non-reversible direction.

B7. The fixture of paragraph B1, wherein the quick connect strap retention features comprise:
a guide channel having an open side; and
a cantilevered toothed member disposed at the open side of the guide channel.

B8. The fixture of paragraph B7, wherein the cantilevered tooth member is resilient so that a free end of the cantilevered tooth member moves relative to the guide channel.

B9. The fixture of paragraph B1, wherein:
the quick connect mounting features of the at least one wire bundle mounting structure include at least one first protrusion; and the mating quick connect mounting features include flexure members configured to snap over and retain the at least one first protrusion.

B10. The fixture of paragraph B1, wherein:

the quick connect mounting features of the at least one wire bundle mounting structure include at least one second protrusion; and the mating quick connect mounting features of the spanner bar include a recess into which the at least one second protrusion is received, where the coupling between the recess and the at least one second protrusion forms a fulcrum of the quick connect mounting features.

B11. The fixture of paragraph B1, wherein:

the frame of each wire bundle mounting structure has a first mounting structure end and a second mounting structure end; and the quick connect mounting features include at least one protrusion disposed at each of the first mounting structure end and the second mounting structure end.

B12. The fixture of paragraph B11, wherein:

the first end of the wire bundle retention strap is pivotally coupled to the frame adjacent the first mounting structure end; and the second end of the wire bundle retention strap is coupled to the frame (by the quick connect strap retention features) adjacent the second mounting structure end.

B13. The fixture of paragraph B1, wherein each wire bundle mounting recess includes a wire bundle mounting structure support surface, at least one of the wire bundle mounting structure support surface being disposed along a different plane than another one of the wire bundle mounting structure support surface of another wire bundle mounting recess.

B14. The fixture of paragraph B1, wherein the spanner bar includes one or more mounting features configured to couple the spanner bar to the structure.

B15. The fixture of paragraph B14, wherein the one or more mounting features include one or more of apertures and snaps.

B16. The fixture of paragraph B14, wherein the one or more mounting features include mechanical fasteners.

B17. The fixture of paragraph B14, wherein the structure is a frame of an aircraft.

B18. The fixture of paragraph B14, wherein the plurality of wire bundle mounting structures are longitudinally spaced along the spanner bar so that the one or more mounting features are accessible between adjacent wire bundle mounting structures.

B19. The fixture of paragraph B1, wherein at least one of the plurality of wire bundle mounting structures includes stackable coupling features, the stackable coupling features being configured to couple at least two wire bundle mounting structures to each other in a stacked configuration.

B20. The fixture of paragraph B1, wherein the quick connect mounting features of each wire bundle mounting structure and the mating quick connect mounting features of the spanner bar are configured so that the wire bundle mounting structure is coupled to the spanner bar with single side spanner bar access.

B21. The fixture of paragraph B1, where at least one of the plurality of wire bundle mounting structures has a different wire bundle interface surface than another of the plurality of wire bundle mounting structures.

B22. The fixture of paragraph B1, wherein the wire bundle retention strap comprises a nylon material.

B23. The fixture of paragraph B1, wherein the wire bundle retention strap comprises a cross-linked polytetrafluoroethylene material.

B24. The fixture bar of paragraph B1, wherein one or more of the wire bundle mounting structure and the spanner bar comprise a metal.

B25. The fixture of paragraph B1, wherein one or more of the wire bundle mounting structure and the spanner bar comprise a plastic material.

B26. The fixture of paragraph B1, wherein one or more of the wire bundle mounting structure and the spanner bar comprise a composite material.

C1. A method of coupling wire bundles to a structure, the method comprising:

coupling a wire bundle mounting structure to a wire bundle with a wire bundle retention strap extending through the wire bundle mounting structure, where the wire bundle retention strap has a first end pivotally coupled to a frame of the wire bundle mounting structure, and a second end having mating quick connect strap retention features that mate with quick connect strap retention features of the wire bundle mounting structure;

coupling a spanner bar to the structure; and coupling the wire bundle mounting structure, with the wire bundle coupled thereto, to the spanner bar, where the wire bundle mounting structure is coupled to a wire bundle mounting recesses of the spanner bar with quick connect mounting features of the spanner bar that mate the quick connect mounting features of the wire bundle mounting structure.

C2. The method of paragraph C1, further comprising inserting the wire bundle retention strap through the wire bundle mounting structure at opposite ends of the wire bundle mounting structure to form a wire bundle passage loop.

C3. The method of paragraph C2, further comprising adjusting a size of the wire bundle passage loop formed by the wire bundle retention strap and the wire bundle mounting structure by pulling the second end of the wire retention strap through the wire bundle mounting structure.

C4. The method of paragraph C1, further comprising coupling another wire bundle mounting structure to the wire bundle with another wire bundle retention strap extending through the other wire bundle mounting structure, where the wire bundle mounting structure and the other wire bundle mounting structure are spaced a predetermined distance from each other along a length of the wire bundle.

C5. The method of paragraph C4, further comprising:

coupling another spanner bar to the structure, where the spanner bar and the other spanner bar are spaced from each other by the predetermined distance; and coupling each of the wire bundle mounting structure and the other wire bundle mounting structure, with the wire bundle coupled thereto, to a respective one of the spanner bar and the other spanner bar.

C6. The method of paragraph C5 wherein the structure is an aircraft fuselage and the predetermined distance is a distance between frame members of the aircraft fuselage.

C7. The method of paragraph C1, wherein the wire bundle mounting structure is coupled to the wire bundle mounting recesses of the spanner bar without tools.

C8. The method of paragraph C1, further comprising coupling one wire bundle mounting structure to another wire bundle mounting structure in a stacked arrangement.

C9. The method of paragraph C1, wherein coupling the wire bundle mounting structure to a wire bundle comprises:

inserting the wire bundle into the wire bundle mounting structure; and coupling the wire bundle, disposed within the wire bundle mounting structure, to the wire bundle mounting structure with the wire bundle retention strap.

D1. A method of forming a wire bundle, the method comprising:

removably coupling a plurality of wire bundle mounting structures to a wire bundle form board, the plurality of wire bundles mounting structures being coupled to the wire bundle form board in a predetermined pattern corresponding to a configuration (e.g., shape, wire routing, etc.) of the wire bundle;

inserting one or more wires, of the wire bundle, into the plurality of wire bundle mounting structures;

coupling the one or more wires to the plurality of wire bundle mounting structures with a respective wire bundle retention strap of each of the plurality of wire bundle mounting structures so as to form the wire bundle; and removing the one or more wires and the plurality of wire bundle mounting structures from the wire bundle form board as a singular unit.

D2. The method of paragraph D1, wherein the wire bundle mounting structures are removably coupled to the wire bundle form board with a robotic automation.

D3. The method of paragraph D1, wherein the wire bundle mounting structures are removably coupled to the wire bundle form board according to indicia, disposed on the wire bundle form board, specifying placement locations of the wire bundle mounting structures for a predetermined wire bundle.

D4. The method of paragraph D1, wherein the wire bundle form board is common to a first wire bundle and a second wire bundle, where the second wire bundle has a different configuration than the first wire bundle.

D5. The method of paragraph D1, further comprising coupling the plurality of wire bundle mounting structures of the singular unit to one or more spanner bars, where the one or more spanner bars are configured for coupling to a structure.

D6. The method of paragraph D5, wherein the structure is a frame of an aircraft.

D7. The method of paragraph D5, wherein the plurality of wire bundle mounting structures of the singular unit are coupled to the one or more spanner bars without tools.

D8. The method of paragraph D5, wherein each wire bundle mounting structure of the singular unit is coupled to a respective wire bundle mounting recess of the one or more spanner bars with quick connect mounting features of the one or more spanner bars.

D9. The method of paragraph D1, further comprising inserting the respective wire bundle retention strap into a respective wire bundle mounting structure, where the respective wire bundle retention strap has a first end pivotally coupled to a frame of the respective wire bundle mounting structure, and a second end having mating quick connect strap retention features that mate with quick connect strap retention features of the respective wire bundle mounting structure.

D10. The method of paragraph D9, wherein the respective wire bundle retention strap is inserted through the respective wire bundle mounting structure at opposite ends of the respective wire bundle mounting structure to form a wire bundle passage loop.

D11. The method of paragraph D10, further comprising adjusting a size of the wire bundle passage loop formed by the respective wire bundle retention strap and the respective wire bundle mounting structure by pulling the second end of the wire retention strap through the respective wire bundle mounting structure.

D12. The method of paragraph D1, further comprising:

stacking another plurality of wire bundle mounting structures to at least some of the plurality of wire bundle mounting structures coupled to the wire bundle form board;

inserting one or more different wires into the other plurality of wire bundle mounting structures and coupling the one or more different wires to the other plurality of wire bundle mounting structures so as to form another wire bundle; and removing the wire bundle and the other wire bundle from the wire bundle form board as the singular unit.

E1. A method of forming a wire bundle, the method comprising:

inserting at least one wire into at least one wire bundle mounting structure; and coupling the at least one wire to the at least one wire bundle mounting structure with a respective wire bundle retention strap extending through a respective wire bundle mounting structure, where each wire bundle retention strap has a first end pivotally coupled to a frame of the respective wire bundle mounting structure, and a second end having mating quick connect strap retention features that mate with quick connect strap retention features of the respective wire bundle mounting structure;

wherein the at least one wire bundle mounting structure is common to both arranging the at least one wire in a predetermined configuration for formation of the wire bundle, and mounting the wire bundle to a structure.

E2. The method of paragraph E1 further comprising coupling the at least one wire bundle mounting structure, with the at least one wire coupled thereto to at least one spanner bar, where the at least one wire bundle mounting structure is coupled to a respective wire bundle mounting recesses of a respective spanner bar with quick connect mounting features of the respective spanner bar that mate the quick connect mounting features of the at least one wire bundle mounting structure.

E3. The method of paragraph E1, further comprising inserting the respective wire bundle retention strap into the respective wire bundle mounting structure.

E4. The method of paragraph E3, wherein the respective wire bundle retention strap is inserted through the respective wire bundle mounting structure at opposite ends of the respective wire bundle mounting structure to form a wire bundle passage loop.

E5. The method of paragraph E4, further comprising adjusting a size of the wire bundle passage loop formed by the respective wire bundle retention strap and the respective wire bundle mounting structure by pulling the second end of the wire retention strap through the respective wire bundle mounting structure.

E6. The method of paragraph E1, further comprising removably coupling the at least one wire bundle mounting structure to a wire bundle form board in a predetermined pattern corresponding to a configuration (shape, routing or wires, etc.) of the wire bundle.

E7. The method of paragraph E6, wherein the at least one wire bundle mounting structure is removably coupled to the wire bundle form board with a robotic automation.

E8. The method of paragraph E6, wherein the at least one wire bundle mounting structure is removably coupled to the wire bundle form board according to indicia, disposed on the wire bundle form board, specifying placement locations of the wire bundle mounting structures for a predetermined wire bundle.

E9. The method of paragraph E6, wherein the wire bundle form board is common to a first wire bundle and a second wire bundle, where the second wire bundle has a different configuration than the first wire bundle.

F1. A wire bundle forming apparatus comprising:
a wire bundle form board having a plurality of mounting structure couplings; and
at least one wire bundle mounting structure configured to couple with the plurality of mounting structure couplings for removably coupling the at least one wire bundle mounting structure to the wire bundle form board in a predetermined pattern corresponding to a predetermined configuration of a wire bundle, where,
the at least one wire bundle mounting structure has a wire receiving portion in which wires, forming the wire bundle, are placed and coupled to the at least one wire bundle mounting structure, and
the at least one wire bundle mounting structure is common to both
arranging the at least one wire in the predetermined configuration for formation of the wire bundle, and,
when removed from the wire bundle form board with the wire bundle coupled to the at least one wire bundle mounting structure, a fixture for coupling the wire bundle to a structure.

F2. The wire bundle forming apparatus of paragraph F1, further comprising a robot configured to at least couple the at least one wire bundle mounting structure to the wire bundle form board in the predetermined pattern.

F3. The wire bundle forming apparatus of paragraph F1, wherein the at least one wire bundle mounting structure includes:
quick connect mounting features that couple with both the plurality of mounting structure couplings and a spanner bar of the fixture; and
quick connect strap retention features.

F4. The wire bundle forming apparatus of paragraph F3, further comprising:
a wire bundle retention strap having
a first end pivotally coupled to the at least one wire bundle mounting structure, and
a second end having mating quick connect strap retention features that mate with the quick connect strap retention features of the at least one wire bundle mounting structure to couple the second end to the at least one wire bundle mounting structure.

F5. The wire bundle forming apparatus of paragraph F4, wherein:
the wire bundle retention strap includes a pivot axle and a strap portion extending from the pivot axle, and
the at least one wire bundle mounting structure includes an axle bearing surface and a retention strap aperture through the axle bearing surface, the retention strap aperture being configured to receive the strap portion of the wire bundle retention strap and the axle bearing surface couples with the pivot axle so as to prevent passage of the pivot axle through the retention strap aperture.

F6. The wire bundle forming apparatus of paragraph F4, wherein the wire bundle retention strap and the at least one wire bundle mounting structure form a wire bundle passage loop through which one or more wire bundles extend.

F7. The wire bundle forming apparatus of paragraph F6, wherein the mating quick connect strap retention features extend along a predetermined length of the wire bundle retention strap so that the wire bundle passage loop has a variably sized wire passage aperture.

F8. The wire bundle forming apparatus of paragraph F4, where the quick connect strap retention features and the mating quick connect strap retention features form a ratchet coupling.

F9. The wire bundle forming apparatus of paragraph F8, wherein the ratchet coupling is configured so that the wire bundle retention strap passes through the quick connect strap retention features in a single non-reversible direction.

F10. The wire bundle forming apparatus of paragraph F3, wherein the quick connect strap retention features comprise:
a guide channel having an open side; and
a cantilevered toothed member disposed at the open side of the guide channel.

F11. The wire bundle forming apparatus of paragraph F10, wherein the cantilevered tooth member is resilient so that a free end of the cantilevered tooth member moves relative to the guide channel.

F12. The wire bundle forming apparatus of paragraph F3, wherein:
the quick connect mounting features of the at least one wire bundle mounting structure include at least one first protrusion; and
each of the plurality of mounting structure couplings of the wire bundle form board include flexure members configured to snap over and retain the at least one first protrusion.

F13. The wire bundle forming apparatus of paragraph F3, wherein:
the quick connect mounting features of the at least one wire bundle mounting structure include at least one second protrusion; and
each of the plurality of mounting structure couplings of the wire bundle form board include a recess into which the at least one second protrusion is received, where the coupling between the recess and the at least one second protrusion forms a fulcrum of the quick connect mounting features.

F14. The wire bundle forming apparatus of paragraph F3, wherein:
each of the at least one wire bundle mounting structure includes a frame having a first mounting structure end and a second mounting structure end; and
the quick connect mounting features include at least one protrusion disposed at each of the first mounting structure end and the second mounting structure end.

F15. The wire bundle forming apparatus of paragraph F14, wherein:
the first end of the wire bundle retention strap is pivotally coupled to a respective wire bundle mounting structure adjacent the first mounting structure end; and
the second end of the wire bundle retention strap is coupled to the respective wire bundle mounting structure adjacent the second mounting structure end.

F16. The wire bundle forming apparatus of paragraph F3, wherein the quick connect mounting features of the at least one wire bundle mounting structure and the plurality of mounting structure couplings of the wire bundle form board are configured so that the at least one wire bundle mounting structure is coupled to wire bundle form board with single side form board access.

F17. The wire bundle forming apparatus of paragraph F1, wherein:
the at least one wire bundle mounting structure includes a plurality of wire bundle mounting structures; and the plurality of mounting structure couplings of the wire bundle form board form a plurality of wire bundle mounting recesses, the plurality of wire bundle mounting recesses being arranged in a grid where each wire bundle mounting recess is configured to couple with a respective one of the plurality of wire bundle mounting structures.

F18. The wire bundle forming apparatus of paragraph F1, wherein at least one of the at least one wire bundle mounting structure includes stackable coupling features, the stackable coupling features being configured to couple at least two wire bundle mounting structures to each other in a stacked configuration.

F19. The wire bundle forming apparatus of paragraph F1, where the at least one wire bundle mounting structure is selectable from a number of different wire bundle mounting structures, at least one of which has a different wire bundle interface surface than another of the different wire bundle mounting structures.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 8-10, referred to above, the blocks may represent operations and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8-10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of forming a wire bundle, the method comprising:
removably coupling a plurality of wire bundle mounting structures to a wire bundle form board, the plurality of wire bundle mounting structures being coupled to the wire bundle form board in a predetermined pattern corresponding to a configuration of the wire bundle;
inserting one or more wires, of the wire bundle, into the plurality of wire bundle mounting structures;
coupling the one or more wires to the plurality of wire bundle mounting structures with a respective wire bundle retention strap of each of the plurality of wire bundle mounting structures so as to form the wire bundle;
removing the one or more wires and the plurality of wire bundle mounting structures from the wire bundle form board as a singular unit; and
coupling the plurality of wire bundle mounting structures of the singular unit to one or more spanner bars, where the one or more spanner bars are configured for coupling to a structure.

2. The method of claim 1, wherein the wire bundle mounting structures are removably coupled to the wire bundle form board with a robotic automation.

3. The method of claim 1, wherein the wire bundle mounting structures are removably coupled to the wire bundle form board according to indicia, disposed on the wire bundle form board, specifying placement locations of the wire bundle mounting structures for a predetermined wire bundle.

4. The method of claim 1, wherein the wire bundle form board is common to a first wire bundle and a second wire bundle, where the second wire bundle has a different configuration than the first wire bundle.

5. The method of claim 1, wherein the plurality of wire bundle mounting structures of the singular unit are coupled to the one or more spanner bars without tools.

6. The method of claim 1, further comprising inserting the respective wire bundle retention strap into a respective wire bundle mounting structure, where the respective wire bundle retention strap has a first end pivotally coupled to a frame of the respective wire bundle mounting structure, and a second end having mating quick connect strap retention features that mate with quick connect strap retention features of the respective wire bundle mounting structure.

7. The method of claim 1, further comprising:
stacking another plurality of wire bundle mounting structures to at least some of the plurality of wire bundle mounting structures coupled to the wire bundle form board;
inserting one or more different wires into the other plurality of wire bundle mounting structures and coupling the one or more different wires to the other plurality of wire bundle mounting structures so as to form another wire bundle; and
removing the wire bundle and the other wire bundle from the wire bundle form board as the singular unit.

8. A method of forming a wire bundle, the method comprising:
inserting at least one wire into at least one wire bundle mounting structure; and
coupling the at least one wire to the at least one wire bundle mounting structure with a respective wire bundle retention strap extending through a respective wire bundle mounting structure, where each wire bundle retention strap has a first end pivotally coupled to a frame of the respective wire bundle mounting structure, and a second end having mating quick connect strap retention features that mate with quick connect strap retention features of the respective wire bundle mounting structure and where the wire bundle retention strap is inserted through the wire bundle mounting structure at opposite ends of the wire bundle mounting structure to form a wire bundle passage loop;
wherein the at least one wire bundle mounting structure is common to both
arranging the at least one wire in a predetermined configuration for formation of the wire bundle, where the at least one wire bundle mounting structure is removably coupled to a wire bundle form board in a predetermined pattern corresponding to a configuration of the wire bundle, and
mounting the wire bundle to a structure.

9. The method of claim 8, wherein the at least one wire bundle mounting structure is removably coupled to the wire bundle form board with a robotic automation.

10. The method of claim 8, wherein the at least one wire bundle mounting structure is removably coupled to the wire bundle form board according to indicia, disposed on the wire bundle form board, specifying placement locations of the wire bundle mounting structures for a predetermined wire bundle.

11. The method of claim 8, wherein the wire bundle form board is common to a first wire bundle and a second wire bundle, where the second wire bundle has a different configuration than the first wire bundle.

12. A method of coupling wire bundles to a structure, the method comprising:
inserting a wire bundle retention strap through a wire bundle mounting structure at opposite ends of the wire bundle mounting structure to form a wire bundle passage loop;
coupling the wire bundle mounting structure to a wire bundle with the wire bundle retention strap extending through the wire bundle mounting structure, where the wire bundle retention strap has a first end pivotally coupled to a frame of the wire bundle mounting structure, and a second end having mating quick connect strap retention features that mate with quick connect strap retention features of the wire bundle mounting structure;
coupling a spanner bar to the structure; and
coupling the wire bundle mounting structure, with the wire bundle coupled thereto, to the spanner bar, where the wire bundle mounting structure is coupled to a wire bundle mounting recesses of the spanner bar with quick connect mounting features integral to the spanner bar that mate the quick connect mounting features of the wire bundle mounting structure.

13. The method of claim 12, further comprising adjusting a size of the wire bundle passage loop formed by the wire bundle retention strap and the wire bundle mounting structure by pulling the second end of the wire retention strap through the wire bundle mounting structure.

14. The method of claim 12, further comprising coupling another wire bundle mounting structure to the wire bundle with another wire bundle retention strap extending through the other wire bundle mounting structure, where the wire bundle mounting structure and the other wire bundle mounting structure are spaced a predetermined distance from each other along a length of the wire bundle.

15. The method of claim 14, further comprising:
coupling another spanner bar to the structure, where the spanner bar and the other spanner bar are spaced from each other by the predetermined distance; and
coupling each of the wire bundle mounting structure and the other wire bundle mounting structure, with the wire bundle coupled thereto, to a respective one of the spanner bar and the other spanner bar.

16. The method of claim 15 wherein the structure is an aircraft fuselage and the predetermined distance is a distance between frame members of the aircraft fuselage.

17. The method of claim 12, wherein the wire bundle mounting structure is coupled to the wire bundle mounting recesses of the spanner bar without tools.

18. The method of claim 8, further comprising coupling the at least one wire bundle mounting structure, with the at least one wire coupled thereto to at least one spanner bar, where the at least one wire bundle mounting structure is coupled to a respective wire bundle mounting recess of a respective spanner bar with quick connect mounting features integral to the respective spanner bar that mate the quick connect mounting feature of the at least one wire bindle mounting structure.

19. The method of claim 1, wherein each wire bundle mounting structure of the singular unit is coupled to a respective wire bundle mounting recess of the one or more spanner bars with quick connect mounting features of the one or more spanner bars.

20. The method of claim 1, wherein the structure is an aircraft fuselage.

* * * * *

UNITED STATES PATENT AND TRADEMARK OFFICE
CERTIFICATE OF CORRECTION

| | |
|---|---|
| PATENT NO. | : 11,394,184 B2 |
| APPLICATION NO. | : 15/972984 |
| DATED | : July 19, 2022 |
| INVENTOR(S) | : Laplante et al. |

It is certified that error appears in the above-identified patent and that said Letters Patent is hereby corrected as shown below:

On the Title Page

Item (54), and in the Specification, Column 1, Lines 1-3, TITLE OF INVENTION please change to the following:
METHOD FOR FORMING A WIRE BUNDLE AND COUPLING THE WIRE BUNDLE TO A STRUCTURE Signed and Sealed this
Second Day of January, 2024

Katherine Kelly Vidal
*Director of the United States Patent and Trademark Office*